(12) United States Patent
Koessler

(10) Patent No.: US 6,894,225 B2
(45) Date of Patent: May 17, 2005

(54) THROUGH-FITTINGS AND BELOW GRADE JUNCTION BOXES EQUIPPED WITH SAME

(76) Inventor: Juergen Koessler, 902 - 1736 West 10th Avenue, Vancouver, British Columbia (CA), V6J 2A6

( * ) Notice: Subject to any disclaimer, the term of this patent is extended or adjusted under 35 U.S.C. 154(b) by 0 days.

(21) Appl. No.: 10/774,444

(22) Filed: Feb. 10, 2004

(65) Prior Publication Data

US 2004/0154820 A1 Aug. 12, 2004

Related U.S. Application Data

(63) Continuation of application No. 10/270,139, filed on Oct. 15, 2002, now Pat. No. 6,730,849.

(30) Foreign Application Priority Data

Oct. 12, 2001 (CA) .............................. 2359125

(51) Int. Cl.[7] .............................................. H02G 15/00
(52) U.S. Cl. .......................... 174/93; 174/65 R; 174/78; 174/77 R; 174/74 A
(58) Field of Search ................................. 174/93, 65 R, 174/78, 77 R, 74 A

(56) References Cited

U.S. PATENT DOCUMENTS 3,584,900 A   6/1971   Lennon et al.
4,692,561 A   9/1987   Nattel

*Primary Examiner*—Dean A. Reichard
*Assistant Examiner*—Jinhee Lee
(74) *Attorney, Agent, or Firm*—Oyen Wiggs Green & Mutala

(57) ABSTRACT

A through-fitting for a box or bulkhead contains a cavity which holds grease. When the through-fitting is tightened, grease from the cavity is automatically injected to seal the through-fitting. The through-fitting may be used in below-grade junction boxes. A junction box has various useful features. The junction box can be conveniently injection-molded. The junction box has application in fields including wired telephone connections.

17 Claims, 25 Drawing Sheets

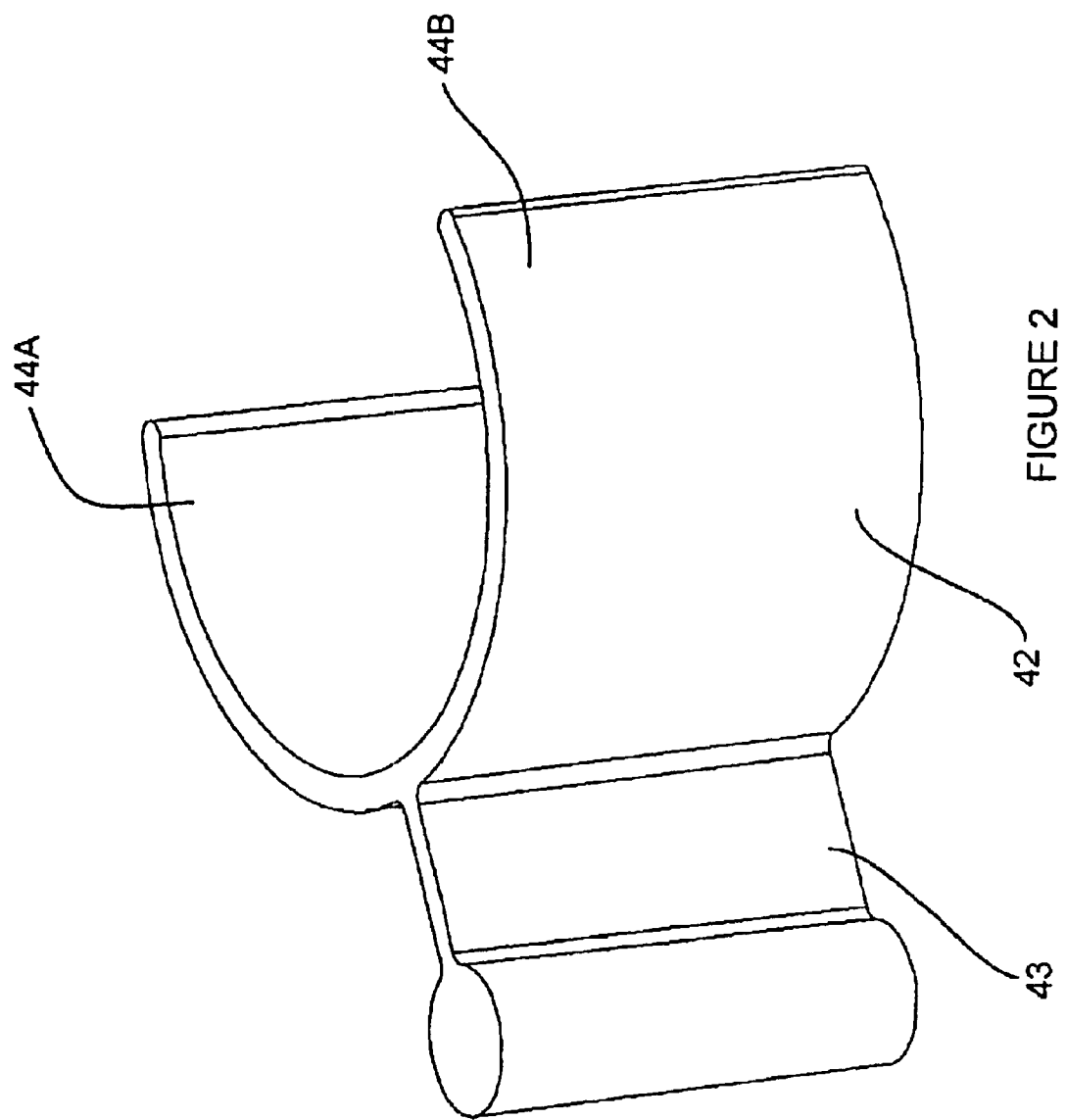

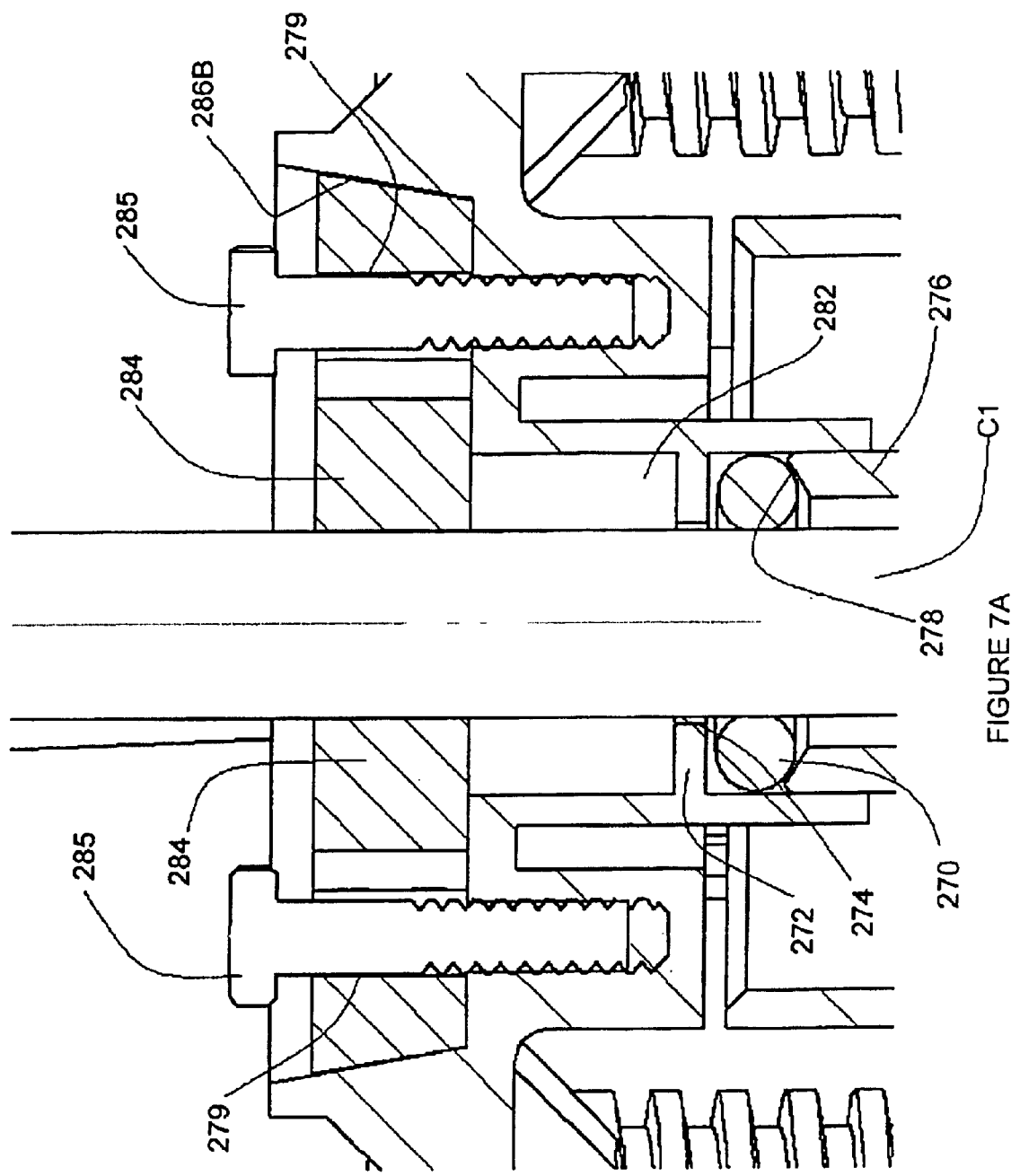

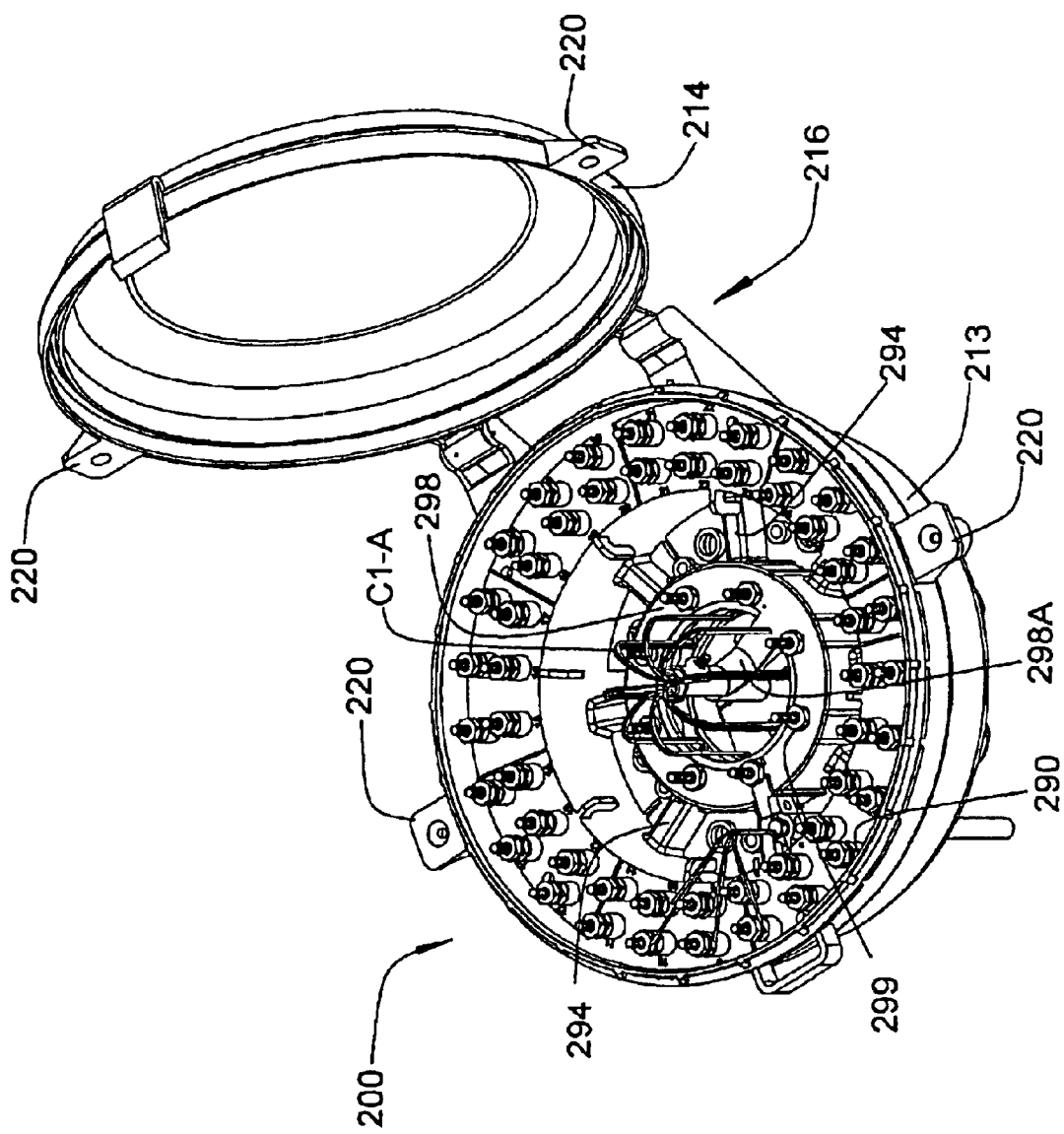

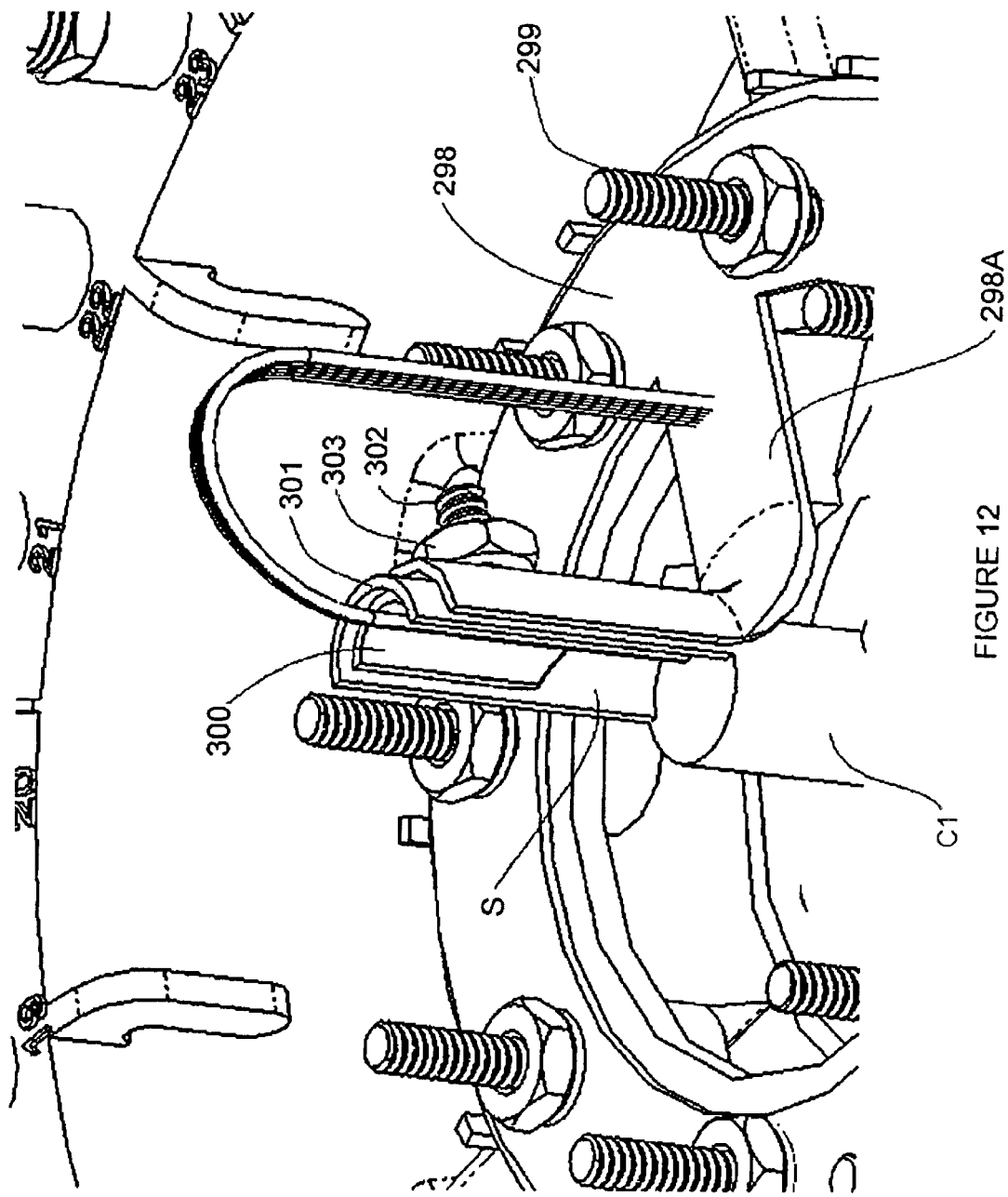

THROUGH-FITTINGS AND BELOW GRADE JUNCTION BOXES EQUIPPED WITH SAME

CROSS-REFERENCE TO RELATED APPLICATIONS

This application is a continuation of U.S. patent application Ser. No. 10/270,139, filed on 15 Oct. 2002 now U.S. Pat. No. 6,730,849 and entitled "THROUGH-FITTINGS AND BELOW GRADE JUNCTION BOXES EQUIPPED WITH SAME", which claims the benefit of the filing date of Canadian Patent Application No. 2,359,125, filed 12 Oct. 2001.

TECHNICAL FIELD

This invention relates to through-fittings for sealing around cables, tubes, sensors or the like. The invention may be embodied in junction boxes which may be installed and used below grade (and may also be used in other applications). The invention has particular application to junction boxes for telephone lines, cable television lines, fiber optic data communication lines, electrical circuits, and the like.

BACKGROUND OF THE INVENTION

Underground junction boxes may remain buried for years. During that time they should protect their contents against the entry of ground water. It is known to completely fill underground junction boxes with a water-displacing medium such as grease. This is messy, however, both at the time the junction box is filled with grease and later if it becomes necessary to access any components or conductors inside the junction box.

There is a need for cost-effective, durable junction boxes suitable for use in below-grade applications. There is also a general need for through-fittings capable of sealing around a cable or the like at the point where the cable passes through a bulkhead.

SUMMARY OF THE INVENTION

This invention provides through-fittings which may be used to seal around cables or the like. The invention also provides junction boxes equipped with such through-fittings and methods for sealing around cables or the like.

Accordingly, one aspect of the invention provides a through-fitting for a cable or the like. The through-fitting comprises a stub having a bore; an annular seal within the bore; and a cap in threaded engagement with the stub. The cap is movable between a first position and a second position. A sleeve is disposed within the bore and has an inwardly-angled end surface. The sleeve is movable axially within the bore relative to the annular seal in response to motion of the cap. When the cap is in the first position, the seal is not substantially compressed. When the cap is in the second position, the end surface of the sleeve compresses the seal radially inwardly. In addition or in the alternative, the end surface of the sleeve may compress a portion of the seal radially outwardly. In some embodiments the sleeve is attached to the cap so that it moves axially as the cap is screwed onto the stub. In such embodiments the sleeve may be formed integrally with the cap, or affixed to the cap by an adhesive, snap fastening, threading, plastic welding, or other suitable fastening means.

In some embodiments of the invention the through-fitting comprises a chamber and a passageway communicating between the chamber and the bore. The chamber has a variable volume. When the cap is in the first position the chamber has a first volume and when the cap is in the second position the chamber has a second volume smaller than the first volume. In such embodiments a sealant such as grease, silicone grease, gel and other types of sealing materials well known in the art may be extruded from the chamber into the bore as the cap is tightened.

The through-fitting may comprise a burst member blocking the passage. The burst member may, for example, comprise a thin plastic member blocking an aperture in the sleeve.

Another aspect of the invention provides a method for sealing a through-fitting around a cable. The method comprises: passing a cable through the through-fitting; compressing a seal in the through-fitting against the cable; and, extruding a sealant around the cable within the through-fitting. Both compressing the seal and extruding the sealant are performed by threading a cap onto the through-fitting.

Further aspects of the invention and features of specific embodiments of the invention are described below.

BRIEF DESCRIPTION OF DRAWINGS

In drawings which illustrate non-limiting embodiments of the invention:

FIG. 2 is an isometric view of a clip that may be used to prevent premature operation of the through-fitting of FIG. 1A;

FIGS. 7A, 7B, 7C and 7D are additional views of the through-fitting of FIG. 6;

FIG. 11 shows the interior of the junction box of FIG. 5;

FIG. 12 is a detailed view of a grounding connection to a cable;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1A:
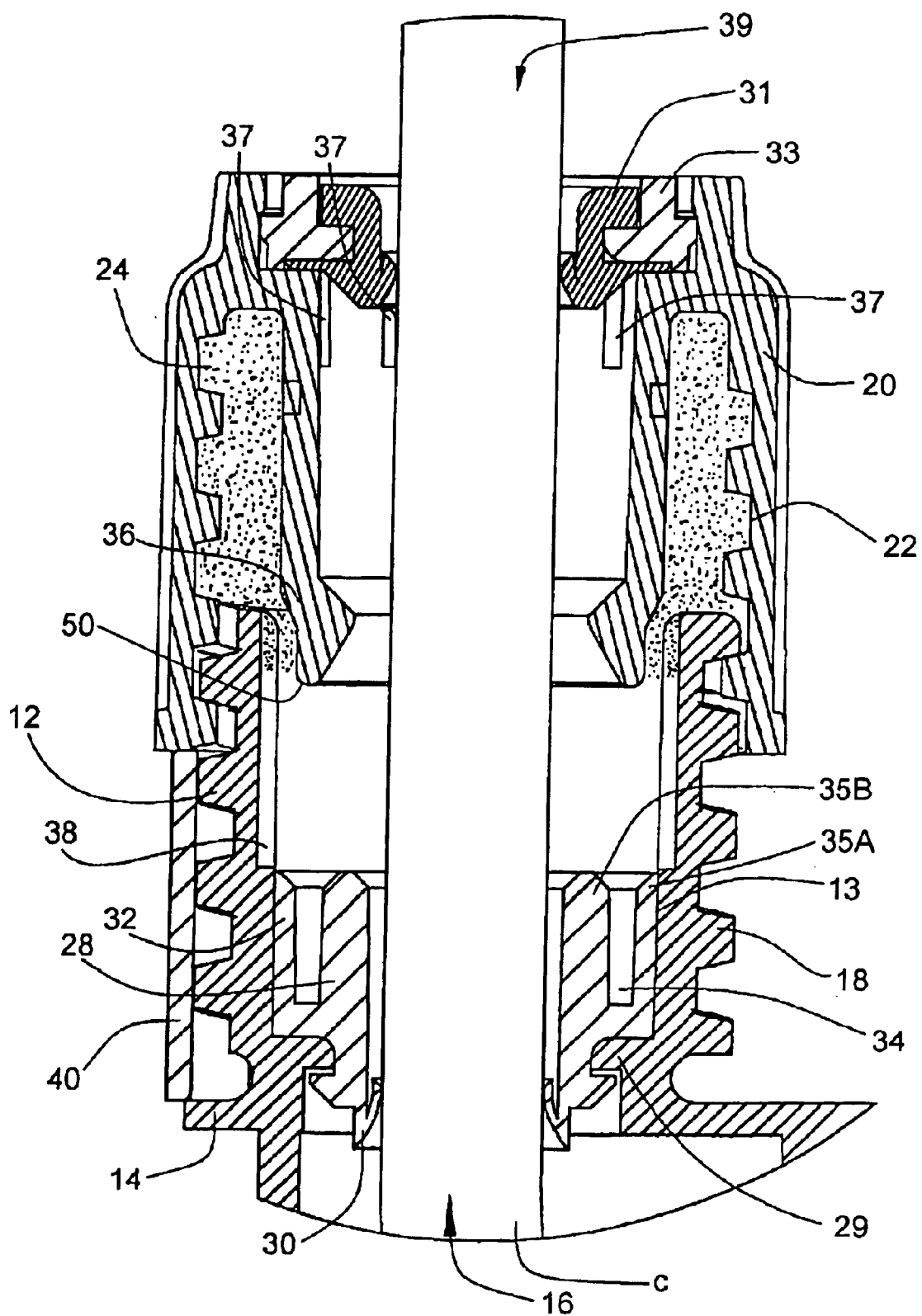
FIGS. 1A, 1B 1C are cross-sectional views through a through-fitting according to a currently preferred embodiment of the invention.
Figure 1B:
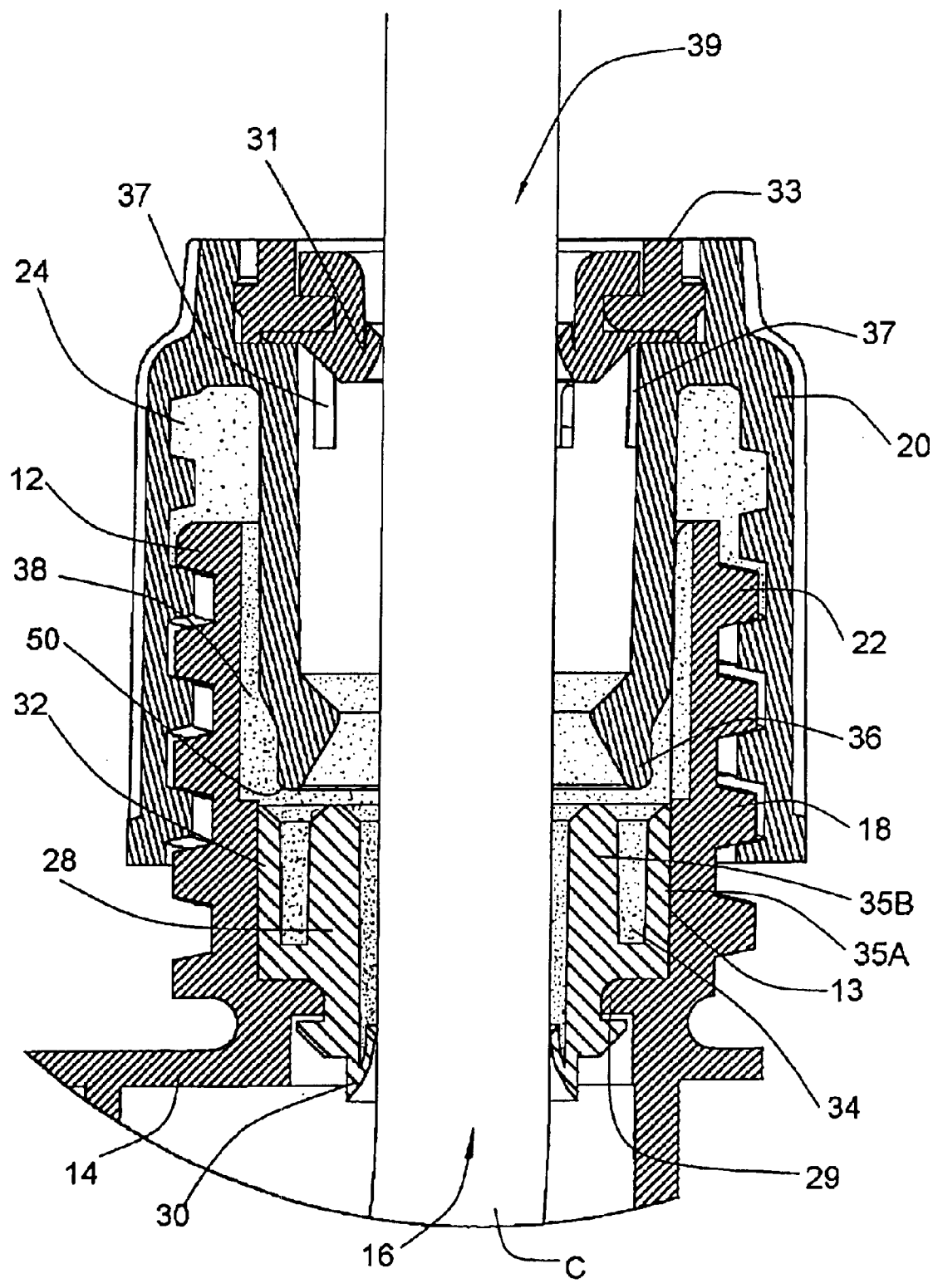
Figure 1C:
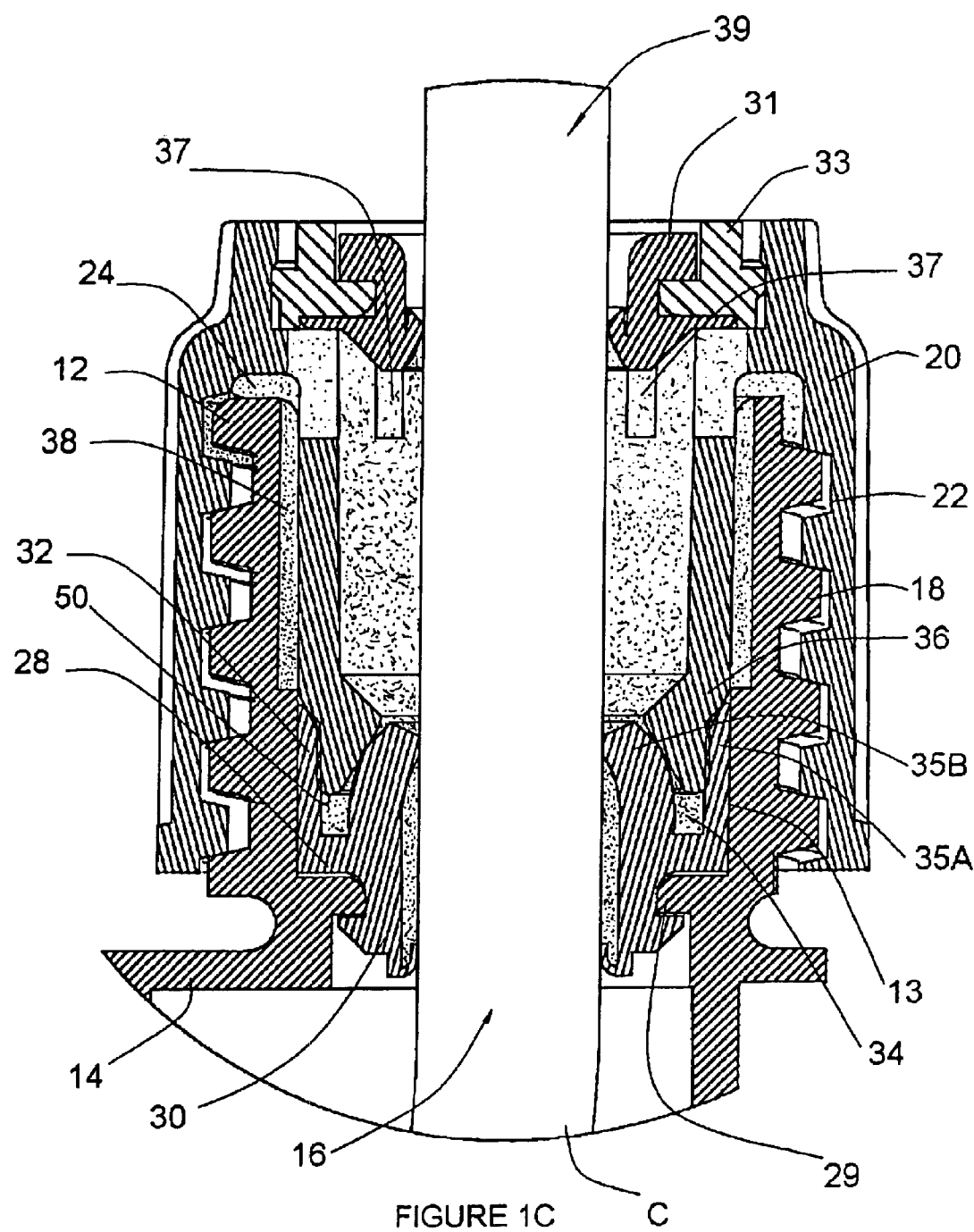

FIGS. 1A, 1B and 1C are a cross-sections through a through-fitting 10 according to a currently-preferred embodiment of the invention. FIG. 1A shows through-fitting 10 in a non-sealed state, as initially supplied. FIG. 1B shows through-fitting 10 in an intermediate state and FIG. 1C shows through-fitting 10 in a sealed state. Through-fitting 10 comprises a threaded stub 12 which projects from a base 14. Base 14 could, for example, be a wall of a junction box. A bore 16 passes through stub 12. A cable C may be inserted through bore 16.

Stub 12 bears male threads 18. A cap 20 bears female threads 22 which engage threads 18. The outer end of stub 12 projects into an annular chamber 24 in cap 20. In the illustrated embodiment, annular chamber 24 is defined between a concentrically arranged sleeve 36 which extends axially into bore 16. Sleeve 36 is a reasonably close fit into the bore of stub 12. Chamber 24 may be filled with a sealant such as a suitable grease. For example, chamber 24 may be filled with a suitable grade of grease, silicone grease, gel or other types of sealing materials well-known in the art. An elastomeric seal 28 is located in stub 12. Seal 28 is preferably retained in bore 16 of stub 12. This prevents seal 28 from being displaced if cable C is pulled outwardly during installation. In the illustrated embodiment, seal 28 has a circumferential groove which receives a flange 29 which projects into bore 16.

Seal 28 has an inner lip seal 30 which seals around cable C and an outer seal 32. In the illustrated embodiment, outer seal 32 comprises an annular groove 34 in seal 28. Groove 34 divides the outer part of seal 28 into a first annular part 35A and a second annular part 35B. Sleeve 36 is located in bore 16. Preferably sleeve 36 is formed integrally with cap 20, such that sleeve 36 is joined to cap 20 at their respective outer ends. In alternative embodiments, cap 20 and sleeve 36 may be separate parts and sleeve 36 may simply abut against cap 20 at its outer end. Sleeve 36 extends inwardly inside bore 16, such that an inner end of sleeve 36 is located to enter annular groove 34. As shown in FIGS. 1A and 1B, sleeve 36 has apertures, such as slots 37.

Through-fitting 10 may be used by passing cable C through bore 16, sleeve 36, seal 28 and outer seal 31. Cap 20 is then turned so that it screws onto stub 12. As this occurs, sleeve 36 encounters annular groove 34 and wedges apart annular parts 35A and 35B of seal 28. As they are wedged apart, annular part 35A is pressed against a wall 13 of bore 16 and annular part 35B is pressed against cable C. In preferred embodiments, the inner end of sleeve 36 and the outer end of seal 28 are sized and shaped so that one of annular parts 35A and 35B is fully displaced before the other. In the illustrated embodiment, the portion of the inner end of sleeve 36 that contacts annular part 35B is more gradually tapered than the portion that contacts annular part 35A. Annular part 35A may be slightly longer than annular part 35B. With this configuration, as cap 20 is tightened, part 35A is fully pressed against wall 13 of bore 16 before part 35B is fully pressed toward cable C. In the illustrated embodiment, annular part 35B is thicker than annular part 35A. Annular part 35B may also comprise notches (not shown) which may be used to make annular part 35B more pliable.

Preferably, seal 28 is forced tightly enough against cable C that seal 28 can serve as a strain relief.

As shown in FIGS. 1B and 1C, when cap 20 is tightened, the volume of chamber 24 is reduced. This forces grease out of chamber 24 into bore 16. To facilitate this, a number of longitudinal grooves 38 may optionally be provided in bore 16 of stub 12. Tightening cap 20 causes grease to be forced along grooves 38 (if present) and through slots 37 of sleeve 36 and discharged into bore 16 around cable C. Cap 20, sleeve 36 and seal 28 are dimensioned so that the grease flows between seal 28 and cable C. Initially, inner seal 30 acts to help block the grease from traveling inwardly along cable C. However, as annular part 35B is forced tightly against cable C, annular part 35B prevents grease from traveling inwardly along cable C.

Chamber 24 preferably has a volume greater than or equal to the volume which remains in the bore of stub 12 after cable C has been placed through it. Thus, excess grease will be forced out along cable C in each direction. The volume of chamber 24 may be, for example, 120% or more of the volume of that part of the bore of stub 12 which is not expected to be occupied by cable C. The volume of chamber 24 may be significantly more than this.

The aperture 39 by way of which cable C passes through cap may have a diameter similar to that of cable C. This helps to ensure that grease will not tend to flow out through aperture 39. A seal 31 similar to seal 30 may also be provided in aperture 39. A seal ring 33 may be secured or attached to cap 20 and may be sized and shaped to fit over a flange in seal 31 to strengthen the seal provided by seal 31 and to retain the position of seal 31. Preferably seal 30 is more flexible than seal 31 so that when grease in bore 16 initially becomes pressurized, it may tend to escape through inner seal 30 instead of through seal 31. However, once annular part 35B is forced tightly against cable C, annular part 35B prevents grease from traveling inwardly along cable C and escaping through inner seal 30. Consequently, some excess grease may escape through seal 31.

Through-fitting 10 preferably includes a mechanism for preventing cap 20 from being screwed down prematurely. This mechanism may take any of various forms. For example, the mechanism could comprise:

a tab 40 (See FIG. 1A) located to block cap 20 from being screwed down until tab 40 has been broken off or bent out of the way;

a clip 42, as shown for example in FIG. 2, which clips around stub 12 below cap 20 and blocks cap 20 from being screwed down until clip 42 has been removed. Clip 42 has a grasping tab 43 and a pair of arms 44A and 44B which are dimensioned to snap into place around stub 12 when cap 20 is in the unscrewed position shown in FIG. 1A; and/or, an adhesive sticker spanning cap 20 and some adjacent structure, such as stub 12.

Figure 1D:
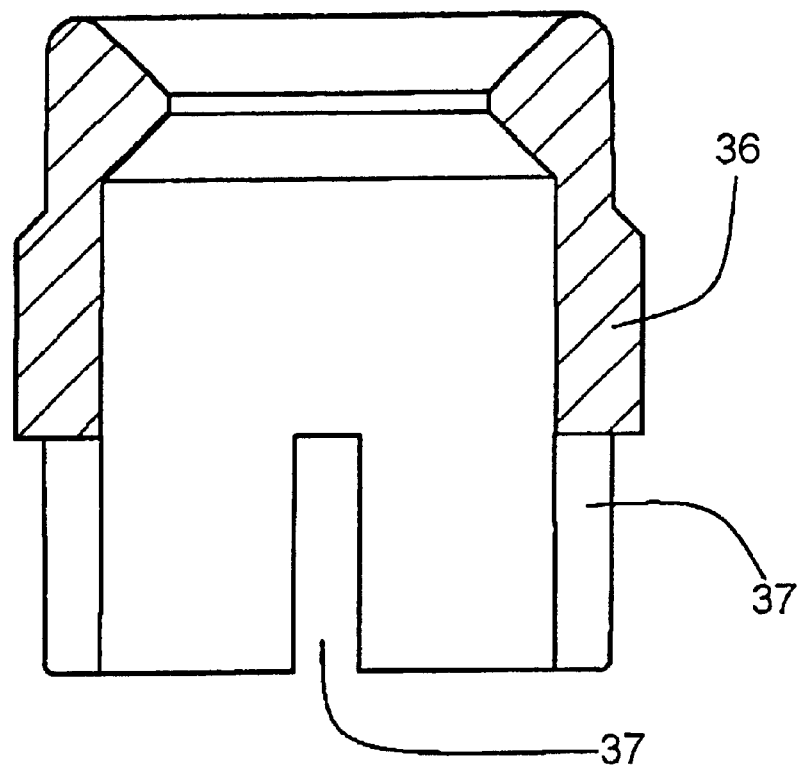
FIGS. 1D and 1E are respectively longitudinal and transverse cross-sections through a sleeve portion of the through-fitting of FIG. 1A.
Figure 1E:
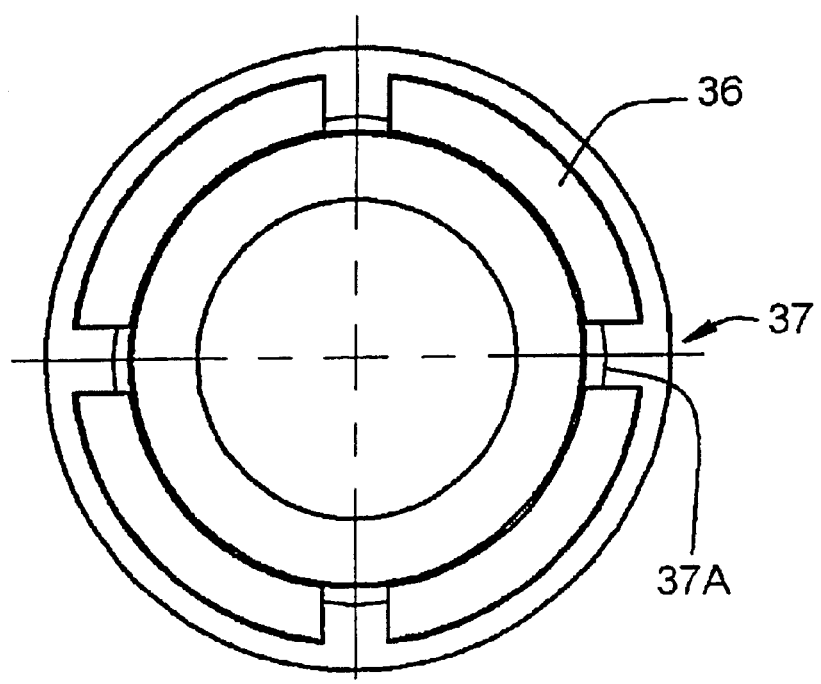

Optionally apertures 37 in sleeve 36 may be covered by rupture members 37A (See FIGS. 1D and 1E). Rupture members 37A may comprise very thin skins of plastic which rupture to permit passage of grease from chamber 24 when through-fitting 10 is closed around a cable C. Rupture members 37A may help to hold grease in place in chamber 24 until it is desired to seal through-fitting 10 around a cable C.

Cap 20 may be pre-charged with grease when through-fitting 10 is put into service. Where this is done, service personnel do not need to insert grease into through-fitting 10 from a separate container of grease.

A through-fitting 10 may be used in many contexts. For example, a through-fitting 10 may be mounted to a flange and used as a bulkhead fitting. A through-fitting 10 may also be used to pass cables into a junction box. Stub 12 may be formed integrally with the junction box.

Figure 3A:
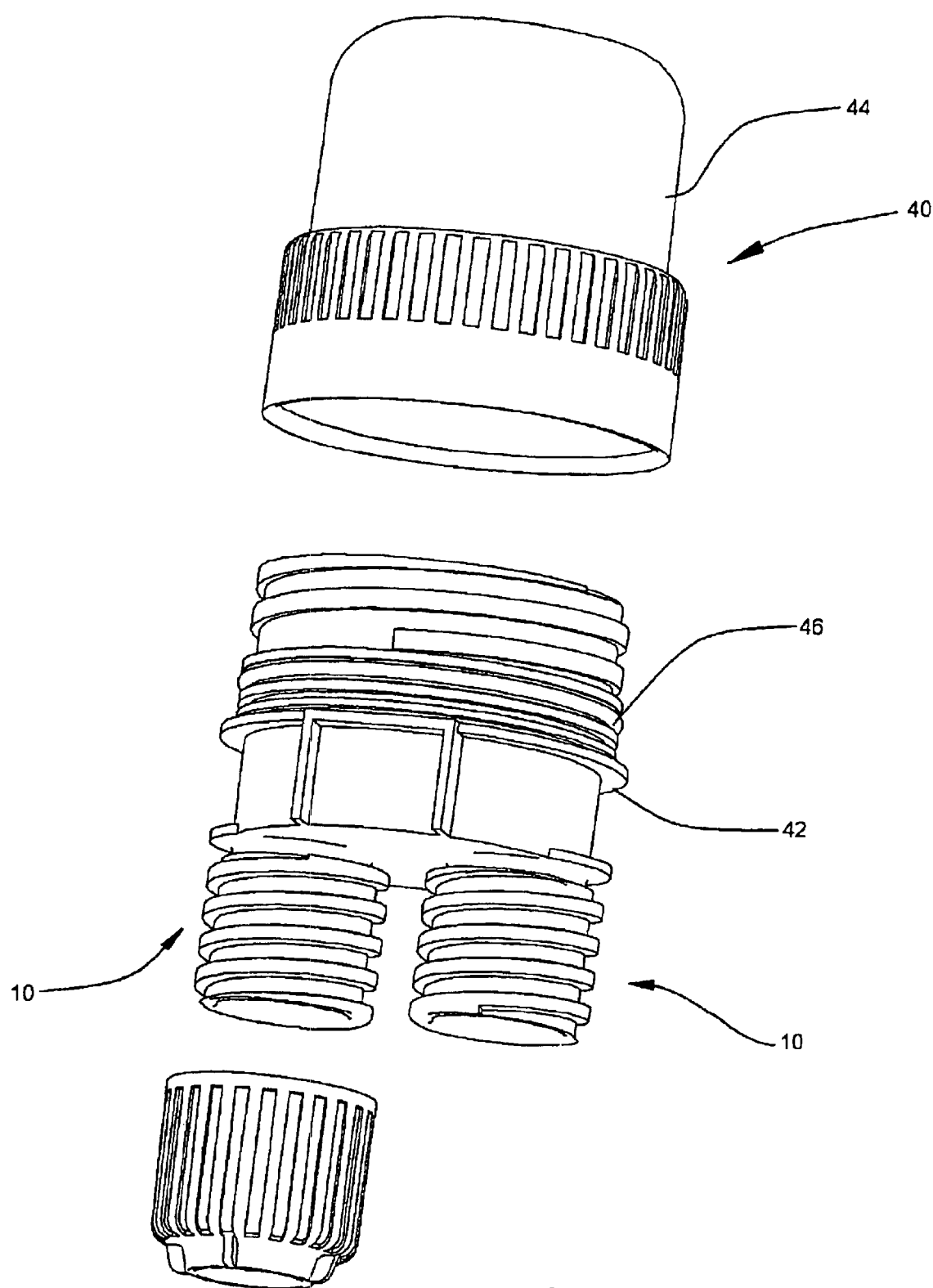
FIG. 3A is an exploded view of a small sub-grade junction box according to one embodiment of the invention.

FIG. 3A shows a junction box 40 according to one embodiment of the invention. Box 40 comprises a base portion 42 which supports a number of through-fittings 10. Base portion 42 is threaded to receive a cover portion 44. An O-ring 46 seals the joint between cover portion 44 and base portion 42.

Figure 3B:
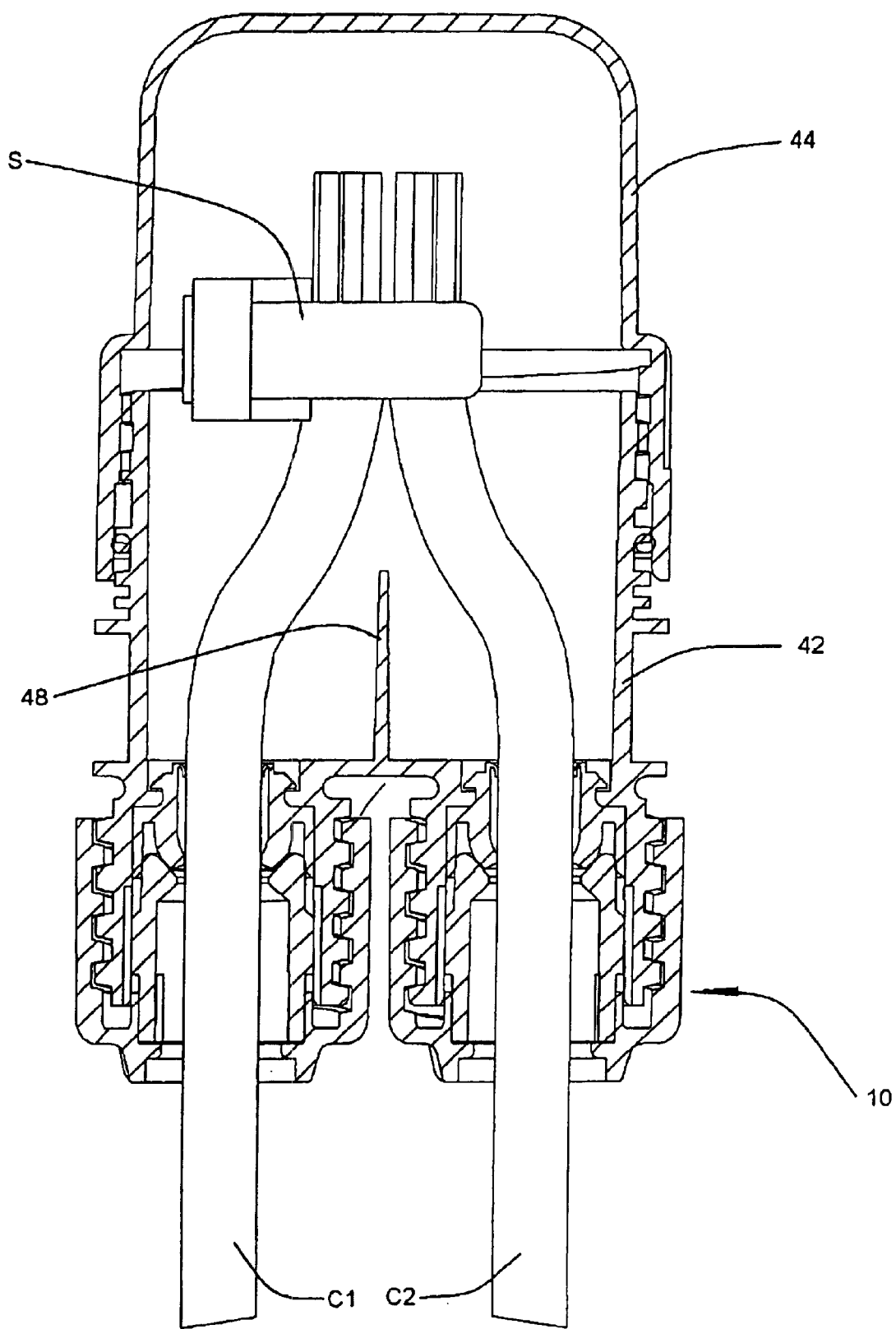
FIG. 3B is a section through the junction box of FIG. 3A.

FIG. 3B is a section through junction box 40 being used to protect splice connections between two cables C1 and C2. In the illustrated embodiment, a web 48 projects from base 42 into junction box 40 between two through-fittings 10. Web 48 keeps a splice S from being pulled too far toward base 42.

Figure 4A:
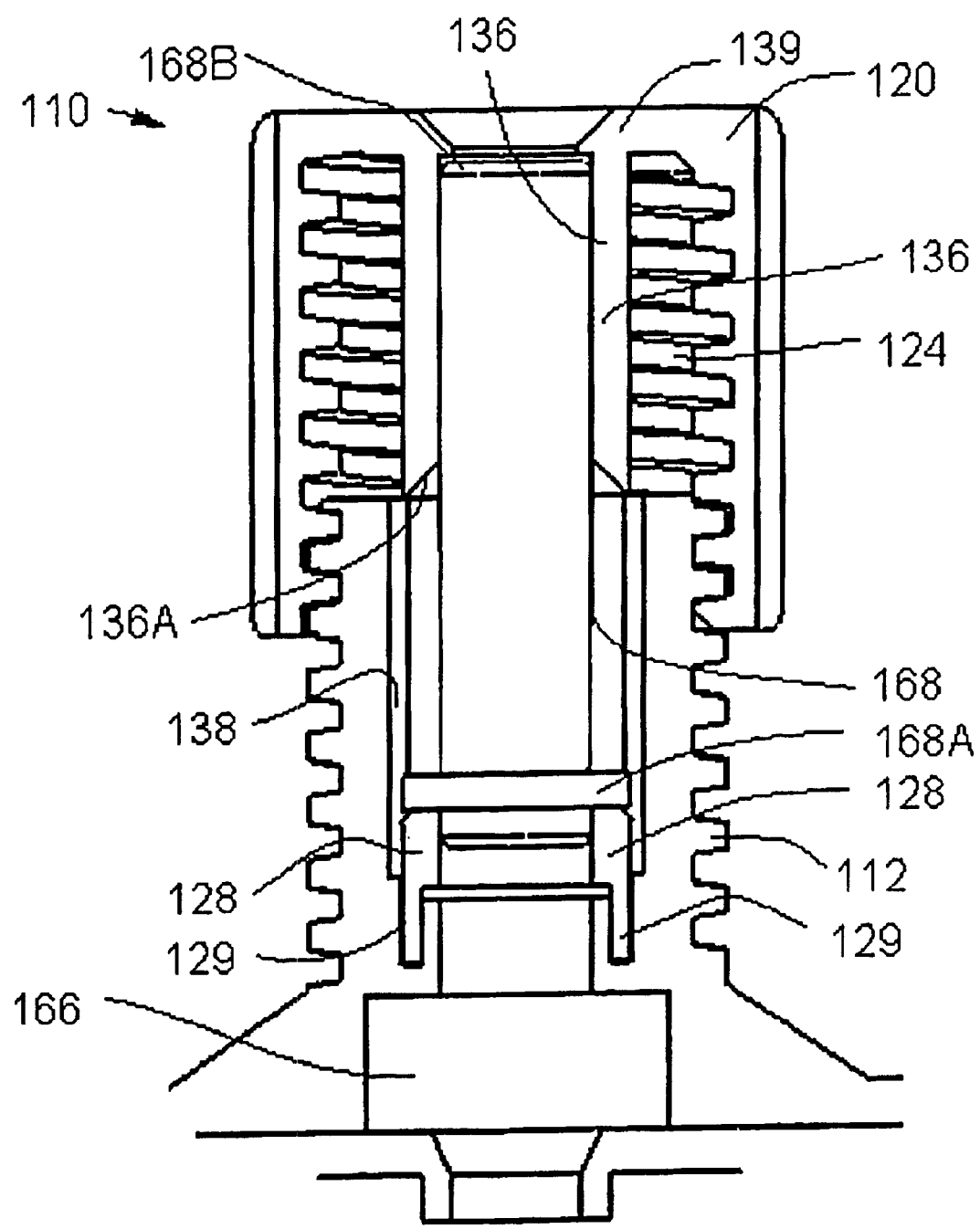
FIGS. 4A and 4B are longitudinal cross-sectional views of a through-fitting according to an alternative embodiment of the invention in open and sealed configurations respectively.

FIG. 4A shows a through-fitting 110 according to an alternative embodiment of the invention. The parts of through-fitting 110 are identified by reference numerals which are incremented by 100 relative to corresponding parts of through-fitting 10. Through-fitting 110 has a threaded stub 112 and a cap 120 which together define an annular chamber 124. Chamber 124 may be filled with grease. The inner wall of chamber 124 is defined by a sleeve 136 which extends axially inside cap 120. An annular elastomeric seal 128 is located within a bore 116 of stub 112. Seal 128 may, in some cases, comprise a one-quarter inch long flat o-ring.

Through-fitting 110 differs from through-fitting 10 primarily in details of the design of seal 128. The through-fitting 10 of FIGS. 1A, 1B and 1C is currently preferred because it is believed that seal 28 will, in general, provide a seal superior to the seal provided by seal 128.

Seal 128 projects axially into bore 116 from a groove 129. The inner end 136A of sleeve 136 is beveled. As cap 120 is tightened, the inner end of sleeve 136 engages the outer end of seal 128 and compresses seal 128 radially inwardly around cable C. Seal 128 is thick enough to accommodate variations in the diameter of cable C. Typically cable C will not be exactly round but may instead be oval in shape. Cap 120 may hit a stop, or the end of threads 118, or, in some other manner, be positively stopped at the point when it has been properly tightened and a proper seal has been made to cable C.

Figure 4B:
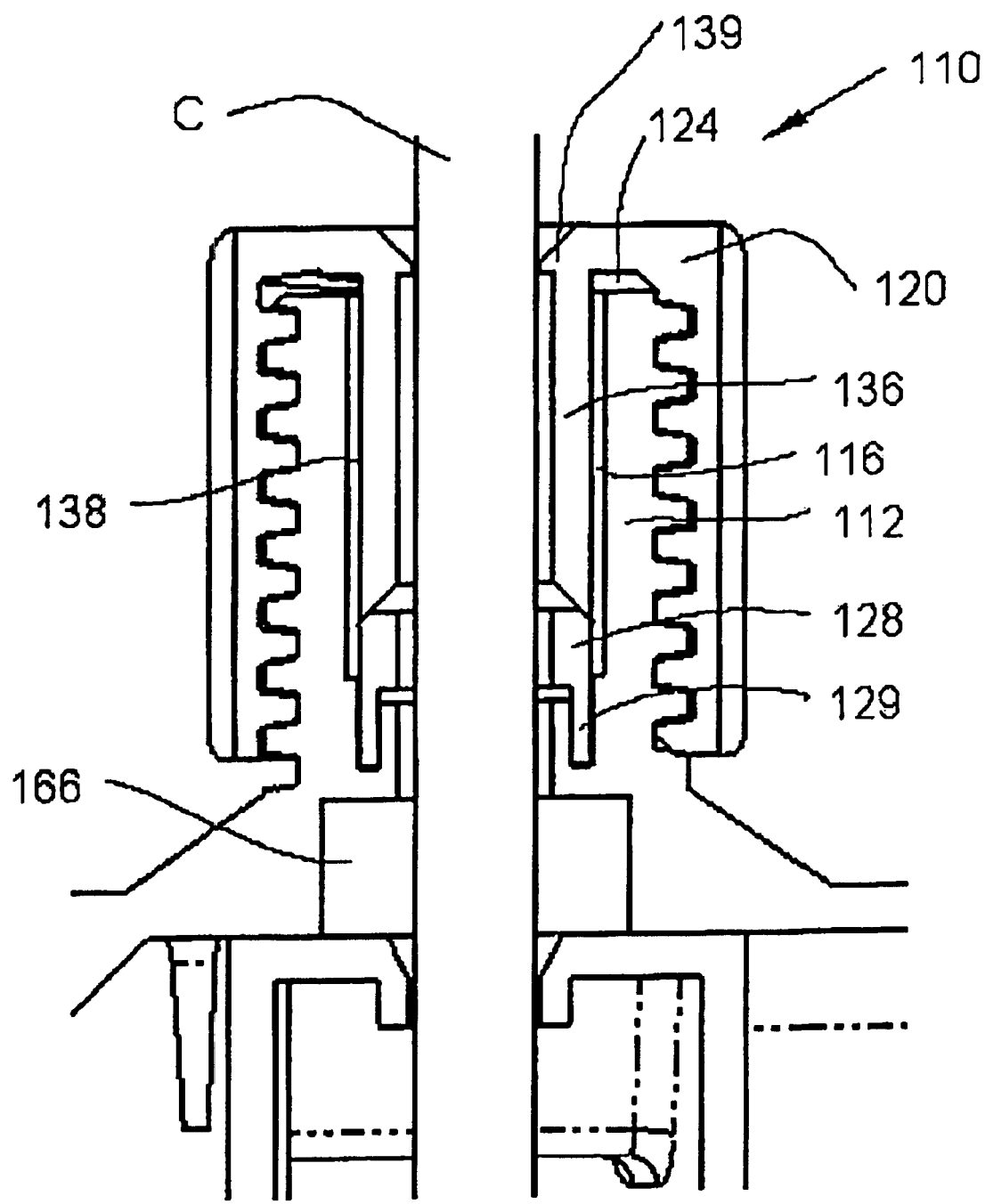

As cap 120 is screwed toward its closed position, which is shown in FIG. 4B, grease is extruded from chamber 124, through grooves 138 and into bore 116. The beveled end of sleeve 136 helps to pack the grease around cable C. Ridge 139 may help to minimize the amount of excess grease that escapes from along cable C to the outside end of through-fitting 110. A chamber 166 may be provided to receive and hold any excess grease which is displaced along cable C toward the inside end of through-fitting 110.

A plug 168 (shown in dashed outline in FIG. 4A) may be supplied to seal through-fittings 110 which are not in use. A junction box which includes through-fittings 10 or 110 may be shipped with plugs 168 in place in some or all through-fittings. When a cable is to be installed in such through-fittings, plug 168 may be removed and may be stored inside the junction box for possible reuse.

Plug 168 has a inner end 168A which bears against seal 28 or 128 and an outer end 168B which abuts against ridge 39 or 139. Cap 20 or 120 is screwed on so that ridge 39 or 139 engages outer end 168B and presses plug 168 into a position so that its inner end 168A is compressing and is sealed against seal 28 or 128. Plug 168 is long enough so that, even when it is installed as described above, chamber 24 or 124 remains open.

Figure 5:
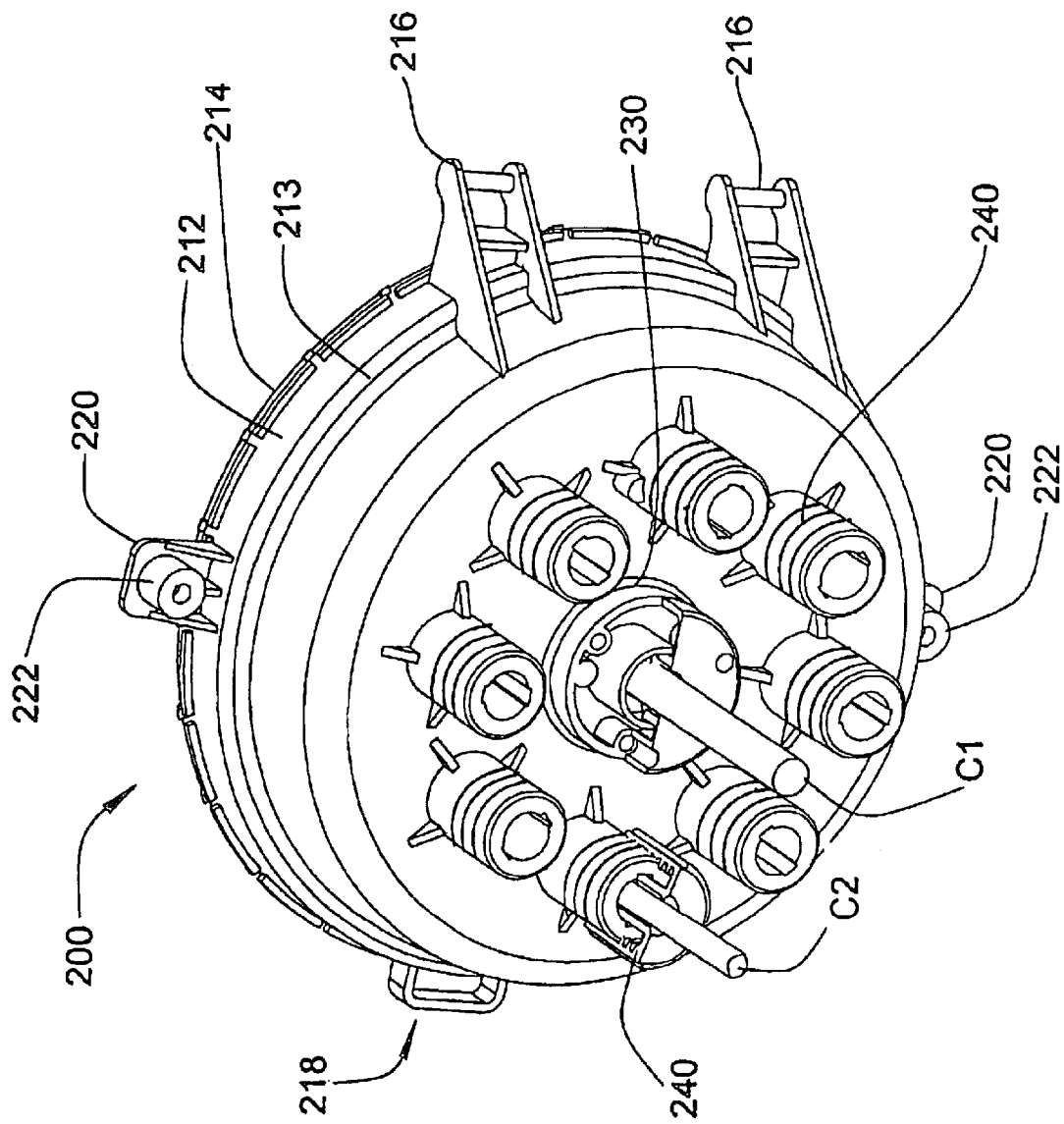
FIG. 5 is a bottom perspective view of a junction box according to an alternative embodiment of the invention.

FIG. 5 shows a junction box 200 according to another embodiment of this invention. Junction box 200 may be used, for example, for joining telephone cables. Junction box 200 receives a telephone cable containing, for example, twenty-five pairs of conductors, each pair capable of serving one telephone line. Inside junction box 200, connections are made to a number of other cables which each may carry a fewer number of pairs of conductors. For example, the box may be used to make connections to branch cables which each carry three pairs of conductors. Each of the branch cables could, for example, be connected to supply telephone lines to a house or business. Junction box 200 is sealed to prevent the entrance of moisture, either where the cables enter the box or around the door which permits access to the interior of the box.

Box 200 comprises a housing 212 which, in this embodiment, comprises a lid 214 and a base 213. Lid 214 is hinged to base 213 at hinges 216. A clasp 218 holds lid 214 in a closed position relative to base 213. Projecting lugs 220 on lid 214 and base 213 permit use of additional fasteners 222, such as screws, to hold box 210 closed and to serve as a backup in case latch 218 fails.

Base 213 accommodates through couplings for a main cable C1 and a number of branch cables C2. In the illustrated embodiment, a through-fitting 230 for main cable C1 is centrally disposed on a bottom of base 213 and is surrounded by through-fittings 240 for eight branch cables. Through-fittings 240 may, for example, comprise through-fittings of the types shown in FIG. 1A or 4A. The number of through-fittings and their arrangement on junction box 200 may be varied. In the illustrated embodiment, through-fittings 240 are arranged around a circle centered generally on through-fitting 230.

Figure 6:
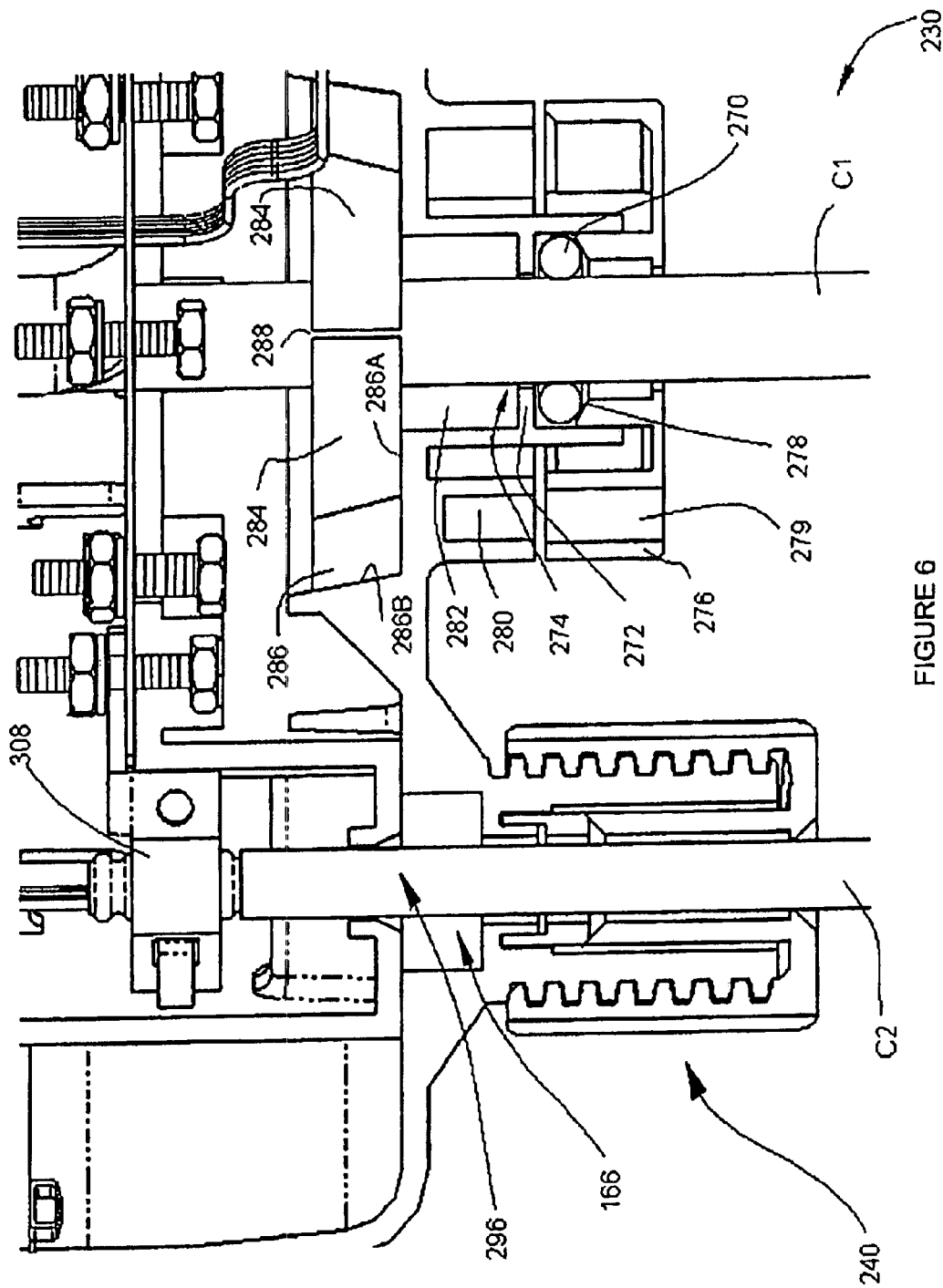
FIG. 6 is a cross-sectional view through a through-fitting according to another embodiment of the invention.

FIG. 6 is a cross-sectional view through a through-fitting 230. FIGS. 7A, 7B, 7C and 7D show other views of through-fitting 230. Through-fitting 230 provides both strain relief for cable C1 and seals against the entry of moisture at the point where cable C1 enters box 200. A through-fitting 230 may be used in other contexts such as points where cables, tubes, or the like, pass into boxes, through bulk heads or the like.

Through-fitting 230 comprises a seal 270, which may comprise an o-ring. O-ring 270 is compressed against a flange 272 which surrounds an opening 274 through which cable C1 enters box 200. A compression member 276 bears a slanting annular face 278. When compression member 276 is clamped against box 200, face 278 compresses o-ring 270 inwardly against cable C1 and also compresses o-ring 270 against surface 272, thereby providing a seal around cable C1. In the illustrated embodiment, compression member 276 is clamped against box 200 by means of screws 285 which pass through holes 279. In the illustrated embodiment, the screws are received in threaded bosses 280 on box 200.

Figure 7B:
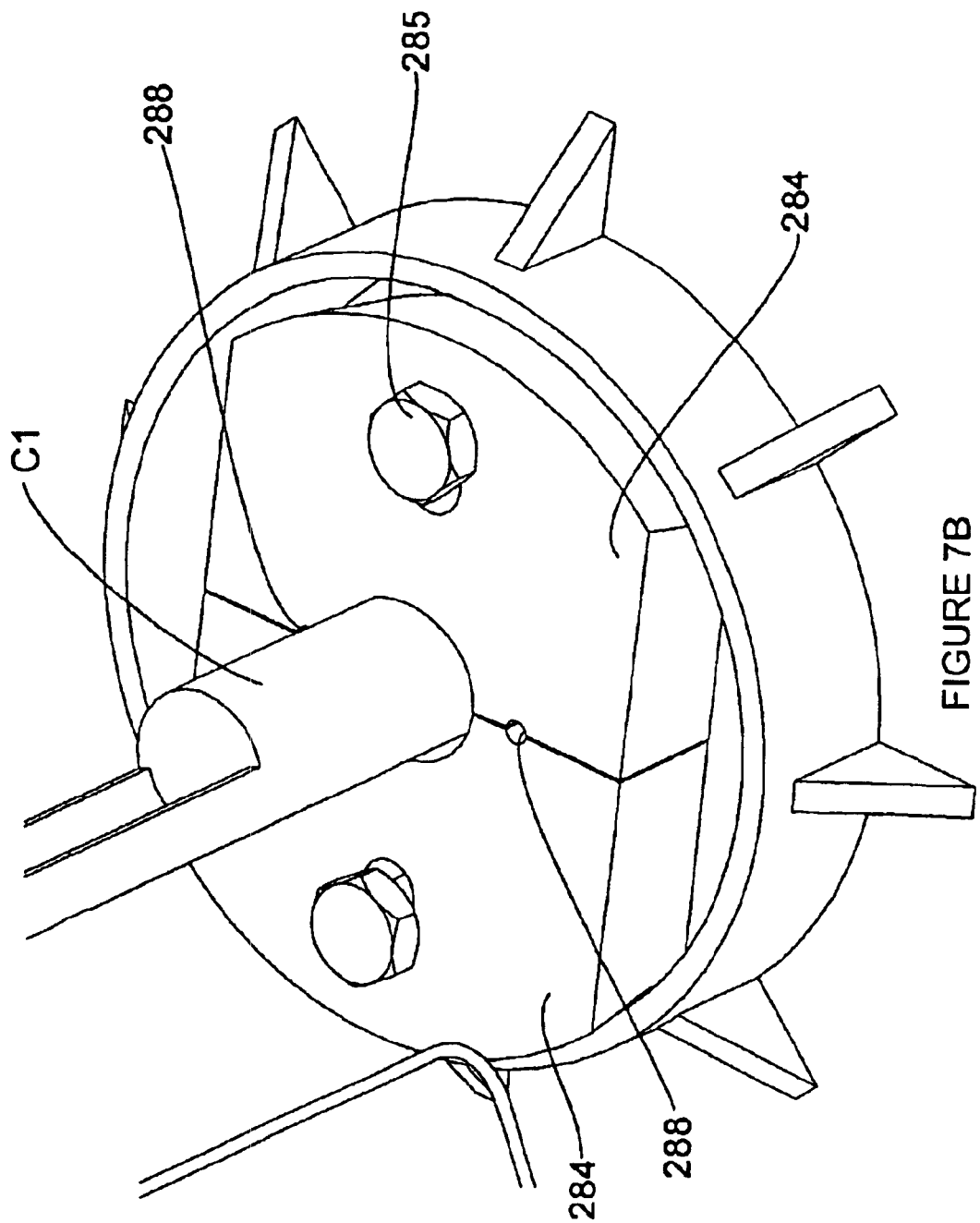
Figure 7C:
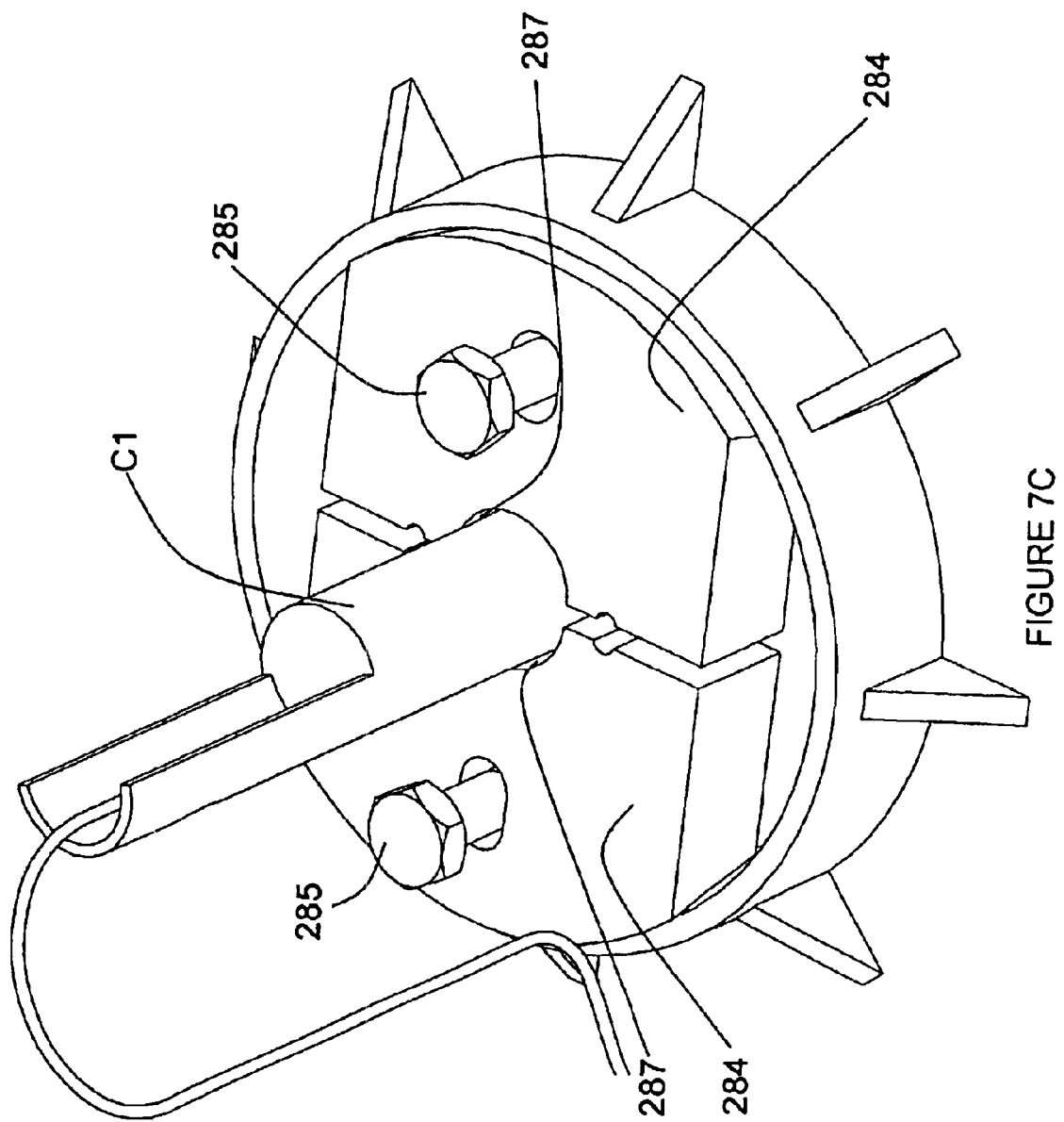
Figure 7D:
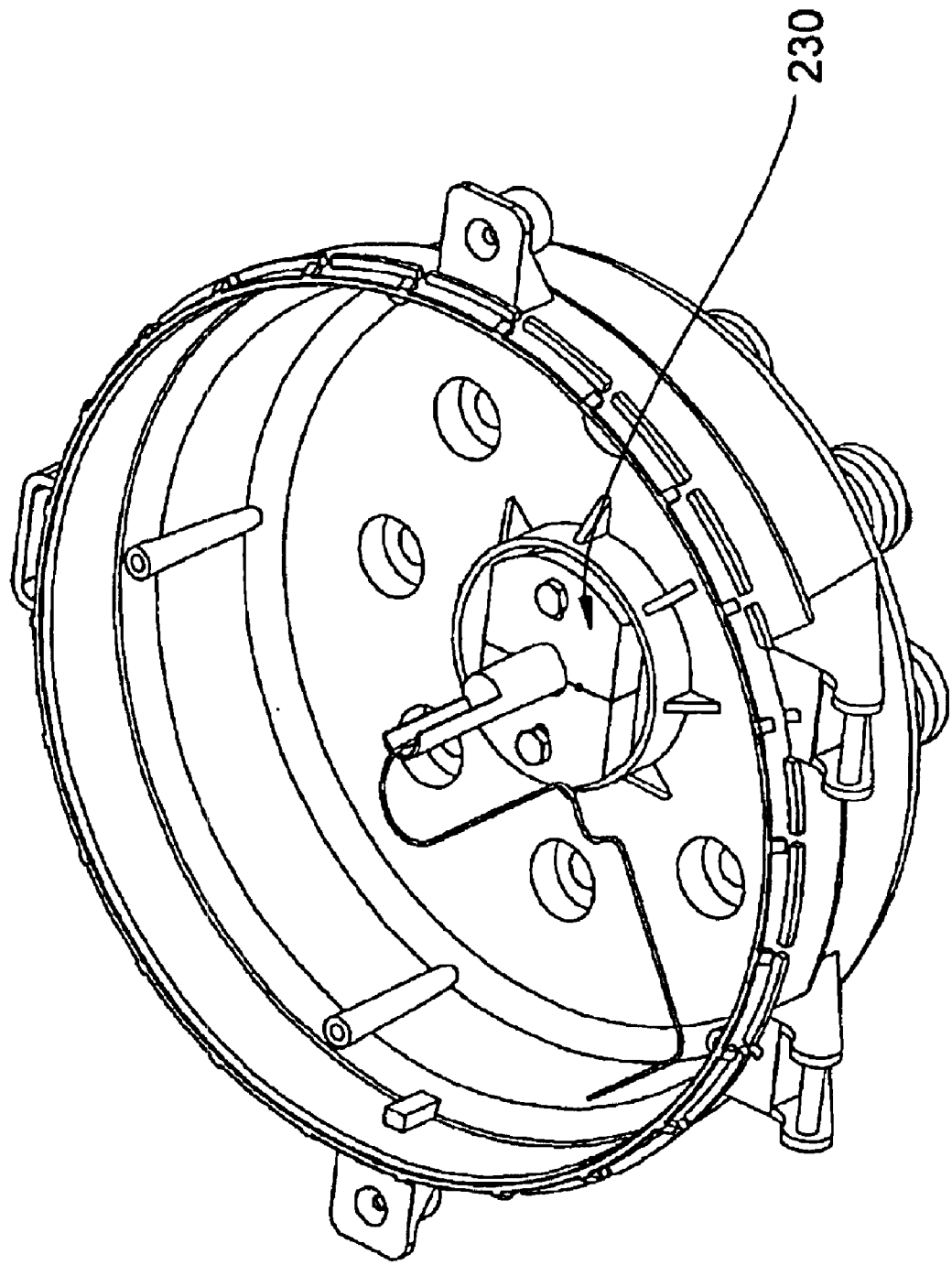

Through-fitting 230 includes a well 282 on the inside of o-ring 270. Well 282 may be filled with grease to provide additional sealing around cable C1. Clamping members 284 cover off the top end of well 282 and additionally clamp against cable C1 to provide strain relief. In the illustrated embodiment, clamping members 284 are each generally semi-circular and have a central channel 287 for receiving cable C1. Clamping members 284 are received in a pan-shaped depression 286 having a flat bottom 286A and a sloping side wall 286B. As shown in FIG. 7C, clamping members 284 are initially spaced apart from one enough to permit cable C1 to be passed between them. Clamping members 284 are forced downwardly into depression 286 by, for example, screws 285, clamps or the like. As this is done, the outer surfaces of clamping members 284 ride down sloped walls 286B and are thereby forced against cable C1 as shown in FIG. 7B. Preferably, clamping members 284 are clamped down until they form a seal against surface 286A which, as noted above, is preferably flat. Apertures 288 are provided for pumping grease into well 282. Preferably there is more than one aperture to permit the grease being introduced to displace air within well 282. This facilitates at least substantially completely filling well 282 around cable C1 with grease.

Clamping members 284 preferably include projections, ribs or bumps which dig at least slightly into the sheathing of cable C1 so as to provide strain relief.

Figure 8:
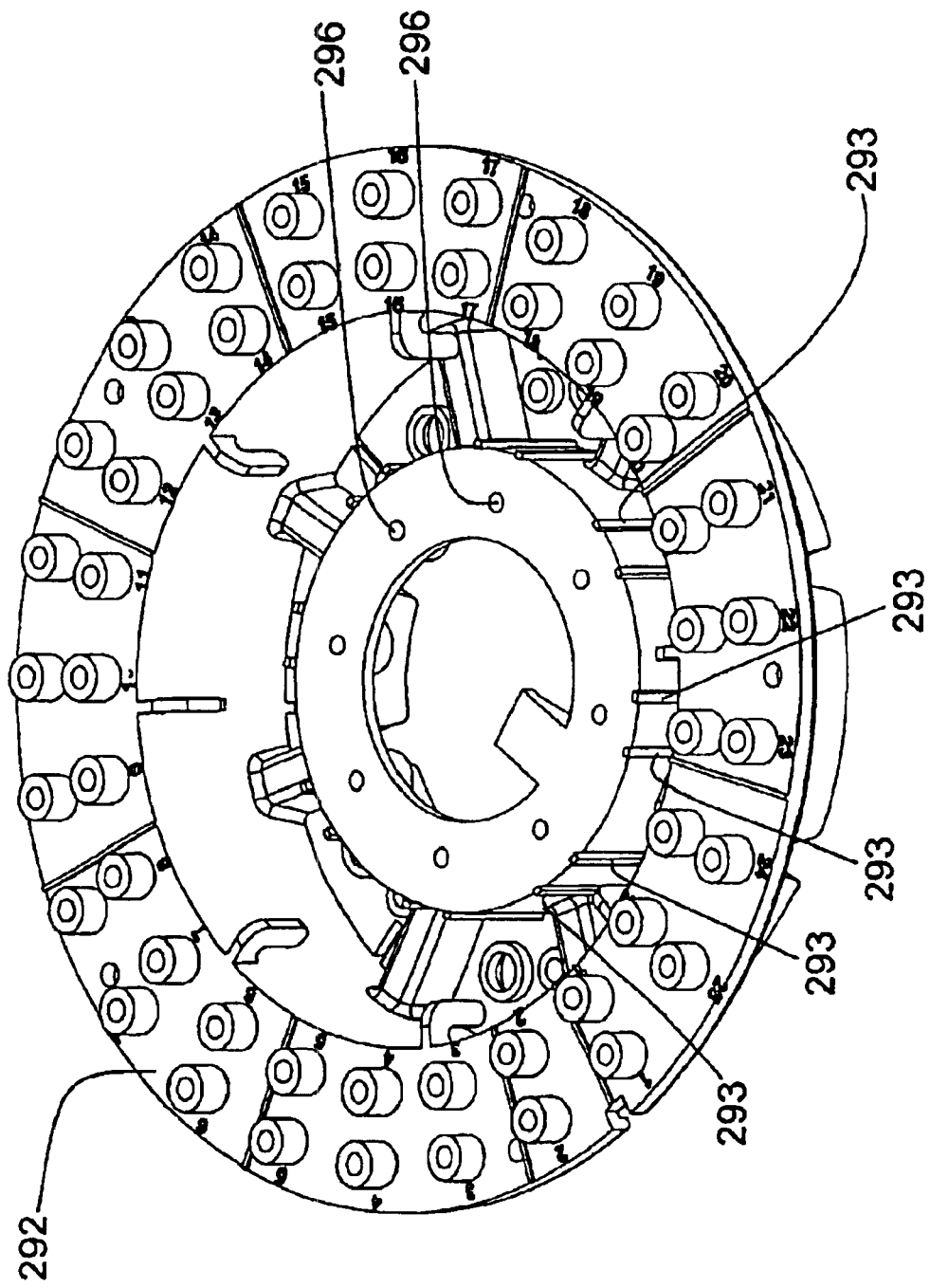
FIG. 8 is a front perspective view of a terminal mounting plate which may be used in a junction box like that of FIG. 5.
Figure 9:
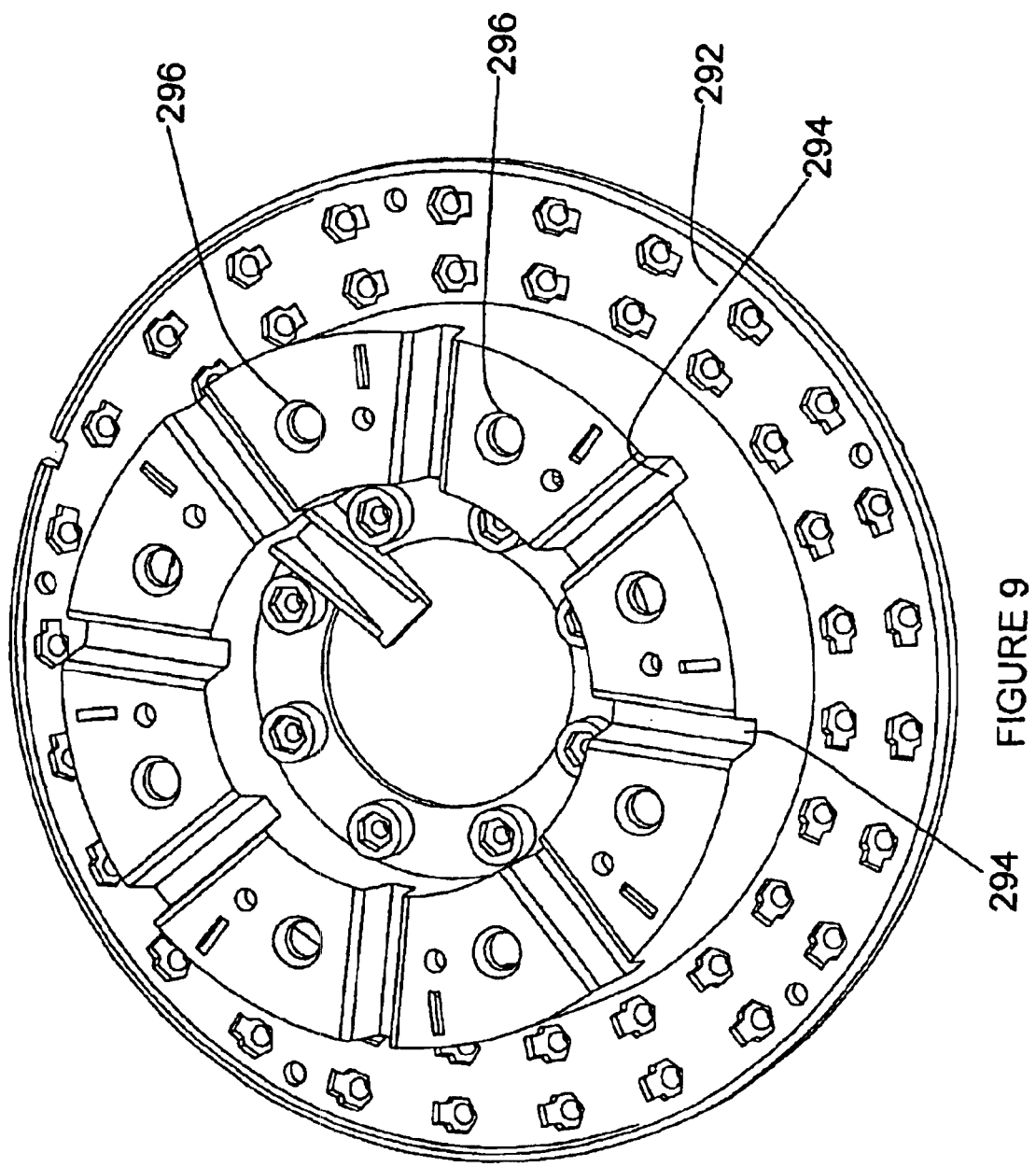
FIG. 9 is a back perspective view of the plate of FIG. 8.
Figure 10:
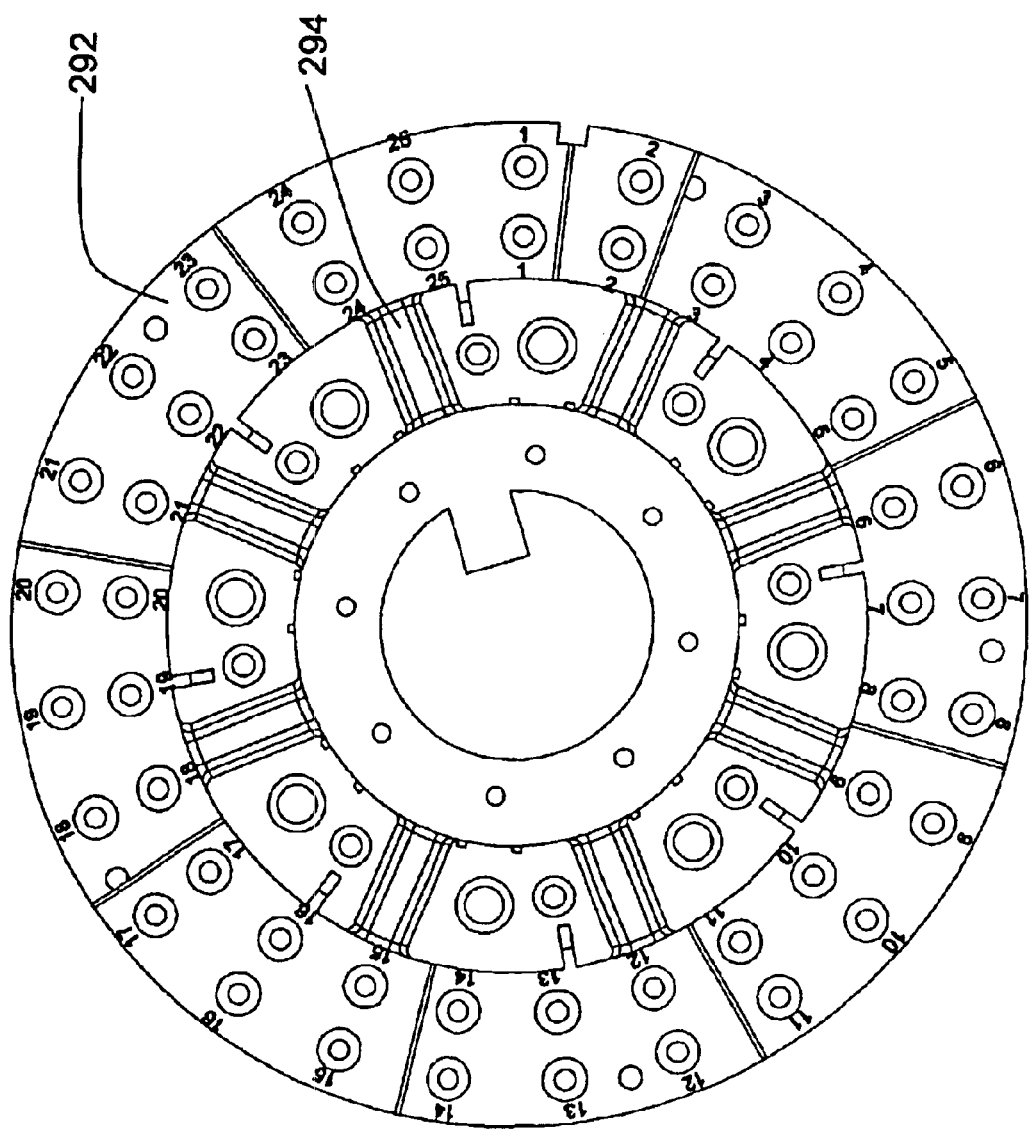
FIG. 10 is a top plan view of the plate of FIG. 8.

Terminals 290 (see FIG. 11) are mounted on a plate 292 which fits inside box 200. FIGS. 8, 9, and 10 are respectively a front perspective view, back perspective view and top plan view of plate 292. FIGS. 8 and 9 show plate 292 without terminals 290.

FIG. 11 shows the interior of a box 200 according to one embodiment of the invention. In this embodiment, the conductors of cable C1 enter box 200 and extend to terminals 290 which are positioned at spaced apart locations in a ring surrounding cable C1. Terminals 290 may be numbered for reference. The individual pairs of conductors C1-A exit from cable C1 and are connected to terminals 290 on the underside of plate 292.

As best seen in FIGS. 8 and 10, plate 292 preferably includes indicia including numbers or letters which identify individual sets of terminals 290. Preferably plate 292 includes ridges, lines, grooves, or the like which visually segregate terminals 290 into groups. One group of terminals 290 may be associated with each through-fitting 240. In the illustrated embodiment, terminals 290 are grouped together to provide three sets of two terminals 290 adjacent each ingress point where a cable C2 can be received into box 200.

Figure 11A:
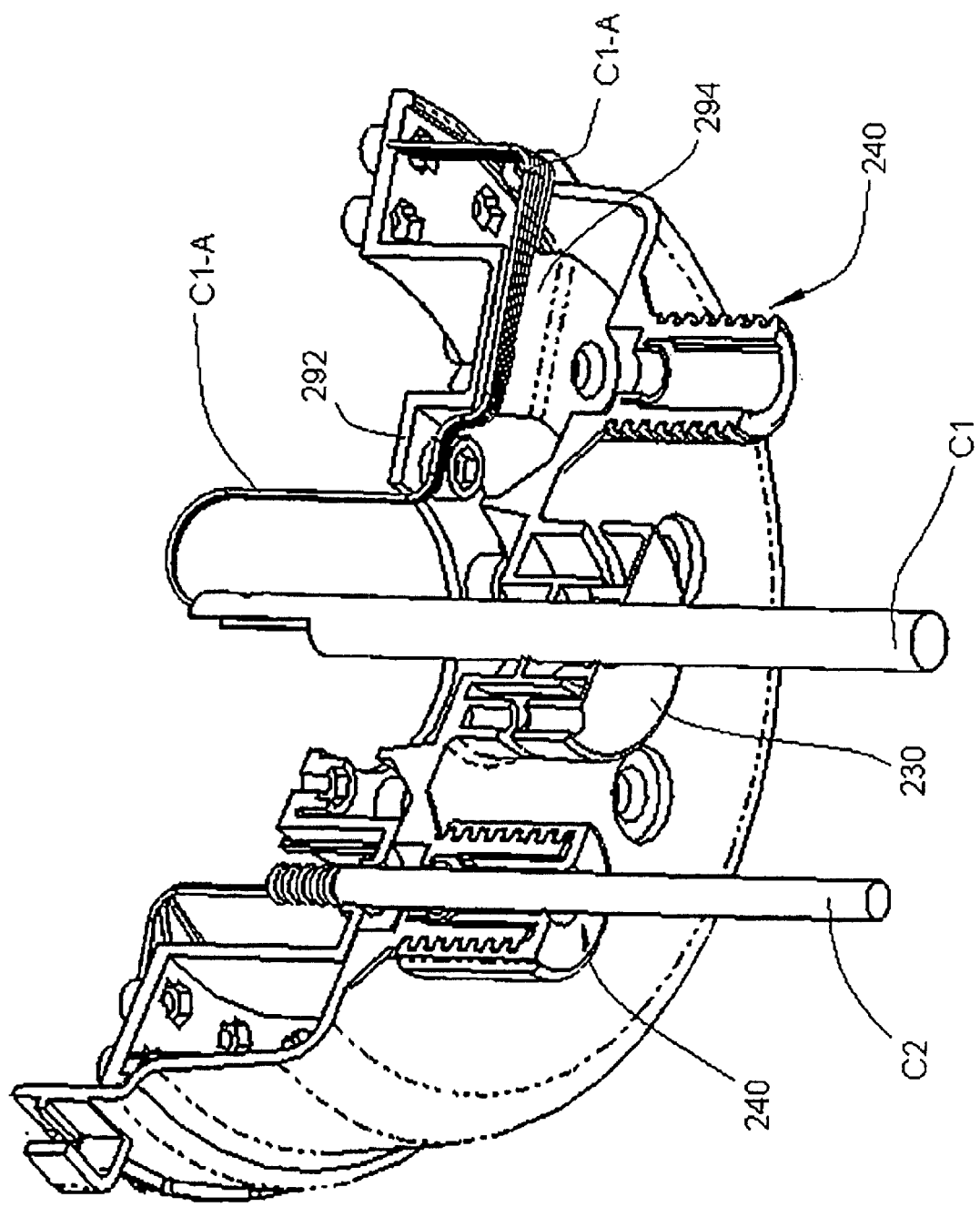
FIG. 11A is a partially cut away view of the box of FIG. 5.

Plate 292 preferably provides channels 294 by way of which cables C1-A can be routed to each group of terminals 290. Channels 294 may, for example, be provided by indentations in the lower surface of plate 292. FIG. 11A shows a partially cutaway view of a box 200 which illustrates how conductors C1-A can be carried through channels 294 beneath plate 292 to make electrical connections to the undersides of terminals 290.

Plate 292 preferably makes a tight contact with base 213 of box 200. This closes off the top of the grease cavities 166 of through-fittings 240 (see FIG. 6). Plate 292 includes an aperture 296 for each incoming cable C2 (see FIGS. 8 and 9). Each aperture 296 is preferably a relatively tight fit to the expected cable C2 so that there is not too much of a tendency for excess grease to be extruded from cavities 166 through aperture 296 around cable C2.

In many applications, properly grounding cables C1 and C2 is important. There is a desire for a robust grounding mechanism. The illustrated embodiment of the invention provides a grounding ring 298 (see FIGS. 11 and 12). Grounding ring 298 is connected to a ground conductor, which is typically a shield, of cable C1 by a strap 298A. Strap 298A may be integral with grounding ring 298. A number of grounding terminals 299 are provided on grounding ring 298. Grounding terminals 299 are preferably located adjacent through-fittings 240 (see FIG. 6) to permit grounding of cables C2.

The precise manner in which grounding is achieved will depend upon the structure of cable C1. FIG. 12 illustrates a possible means of connection to the ground conductor of cable C1. This structure may be used where cable C1 has a shield which surrounds the conductors of cable C1. This connection is known in the trade as a "bullet bond". Curved metal conductors 300 and 301 which match the curvature of sheath S are placed inside and outside sheath S respectively. A bolt 302 is connected to conductor 300. Bolt 302 passes through an aperture in shielding S and also passes through an aperture in strap 298A. A nut 303 clamps conductor 300 tightly to shield S and also provides a good electrical contact with strap 298A. The bullet bond may be installed by slitting sheath S and peeling back a portion of sheath S to permit the conductors to be moved away to allow the insertion of member 300. In FIG. 12, the conductors and other portions of cable C1 have been cut away to provide a view of member 300.

Figure 13:
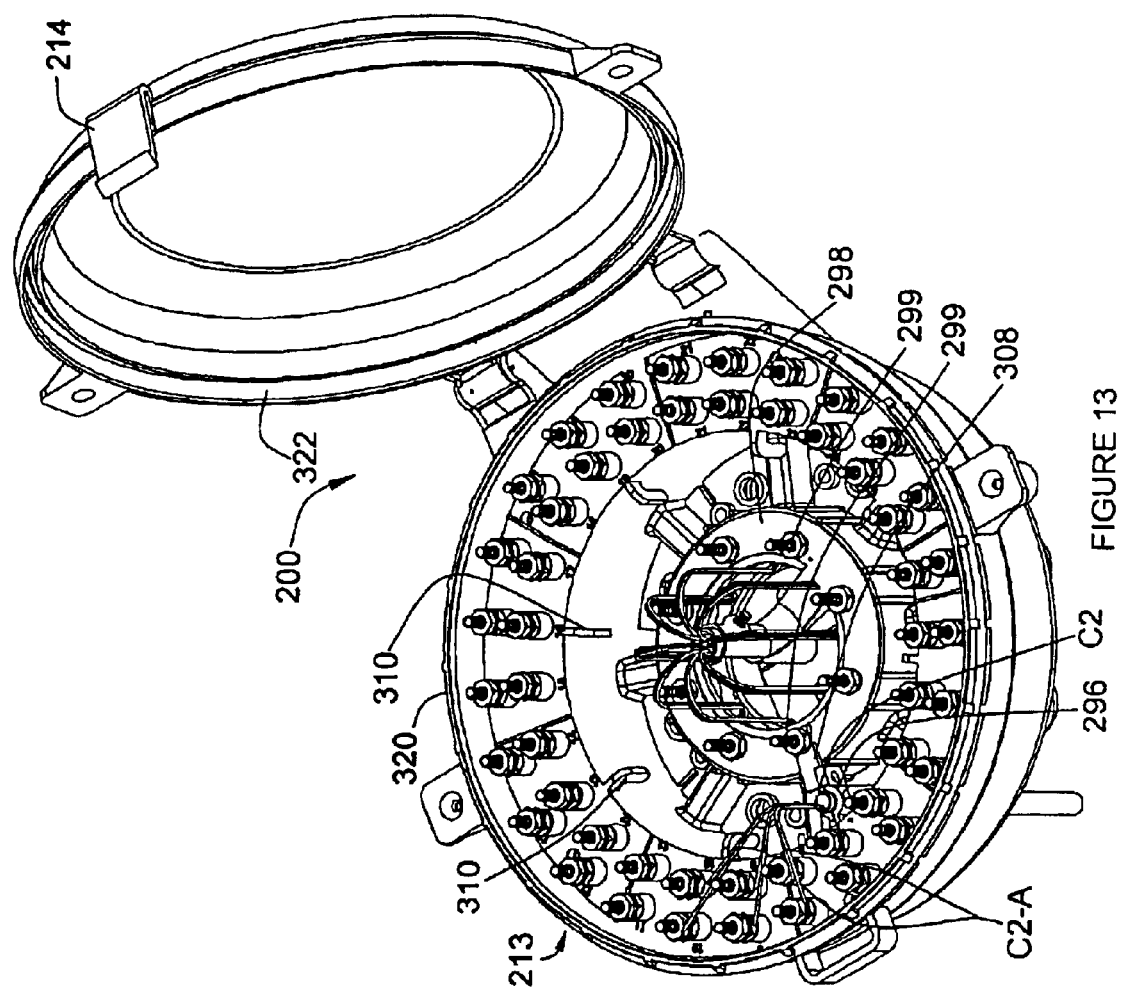
FIG. 13 is a view of the box of FIG. 5 in an open configuration with a branch cable installed.

FIG. 13 shows a box 200 according to the invention in which a cable C2 has been installed. Cable C2 protrudes through aperture 296 into the interior of box 200. A section of the sheath of cable C2 is stripped away to expose the shielding conductor which, in the illustrated embodiment, surrounds the conductors of cable C2. FIG. 6 shows grounding clamp 308 in side view. A ground clamp 308 is clamped onto cable C2 to make electrical contact with the sheath of cable C2. The inward end of ground clamp 308 has a slot which receives one of ground terminals 299. A nut (not shown) on the ground terminal 299 can then clamp the ground clamp 308 against grounding conductor 298 to provide a good ground connection for cable C2. Individual conductors C2-A from cable C2 can be attached to selected ones of terminals 290. Hooks 310 may be provided for neatly storing conductors out of the way.

Ridges 293 (see FIG. 8) on plate 292 prevent grounding clamp 308 from twisting to one side or the other after grounding clamp 308 is installed.

A junction box 200 as described above provides a convenient way for connections to be made from the conductors of cable C1 to the conductors of individual cables C2. Furthermore, the box provides a convenient point at which tests may be made and signals may be sampled to located broken conductors or other defects which interfere with the operation of a system which includes conductors of cable C1 and/or C2.

Figure 14:
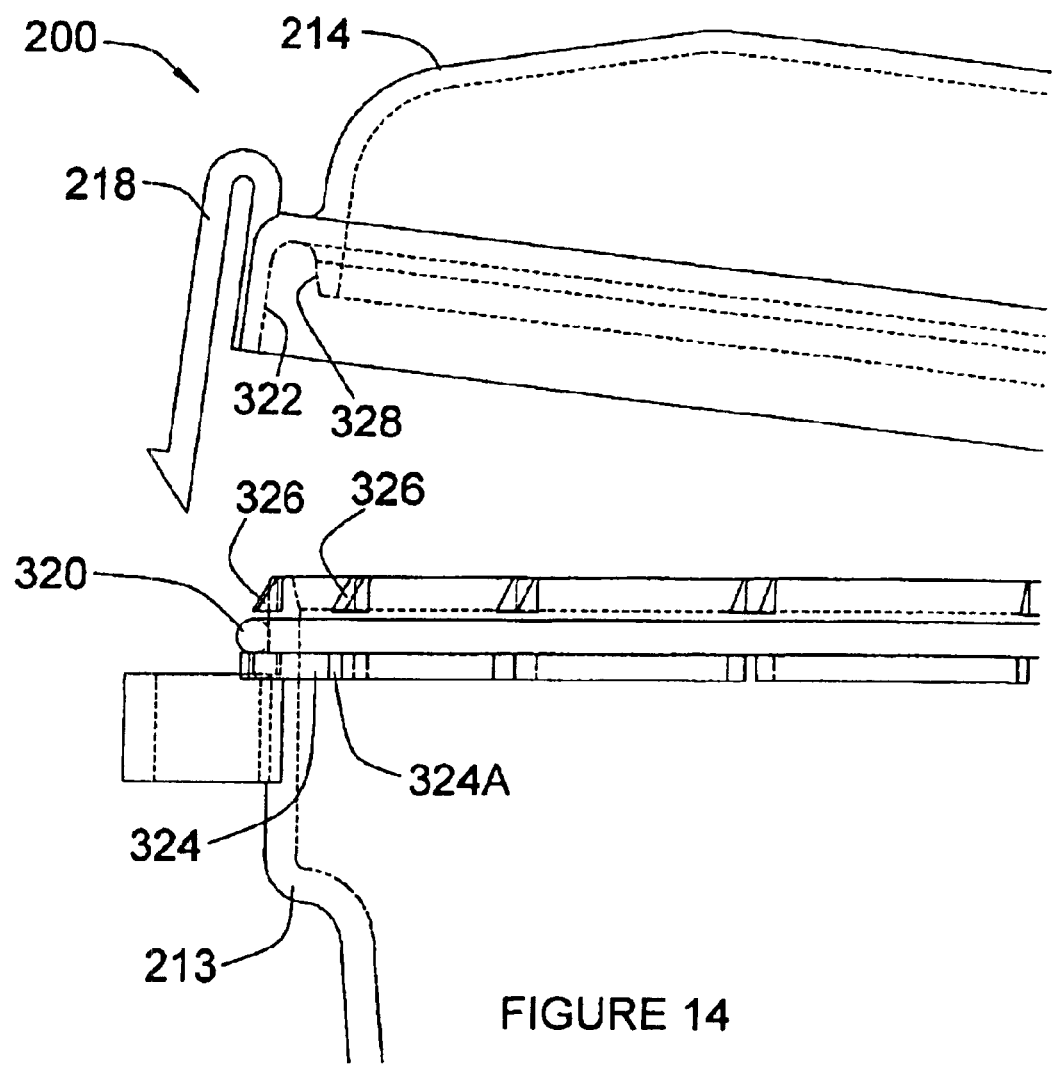
FIG. 14 is a partial sectional view through a portion of the box of FIG. 5 showing a seal and clasp.

FIG. 14 shows a sealing o-ring 320 which assists in providing a seal between top 214 and base 213 of box 200 when box 200 is closed. O-ring 320 is received between the wall of base 213 and an interface 322 of top 214. As shown in FIG. 14, o-ring 320 may be received between an interrupted flange 324 and a number of protrusions 326. This construction permits base 213 to be injection-molded in a relatively straightforward manner while providing retaining means for o-ring 320 both above and below. Each location at which there is a projection 326 corresponds to a gap 324A in flange 324.

It can be appreciated that when top 214 is closed, interface 322 compresses o-ring 320 inwardly against base 213. To assist in providing the best seal possible, lid 214 has a ramped surface 328 located inwardly from surface 322. When top 214 is fully closed, ramped surface 328 wedges inside the upper edge of base 213 and urges it outwardly, thereby insuring that a seal will not be lost by excessive inward deflection of the edge of base 213.

Figure 15:
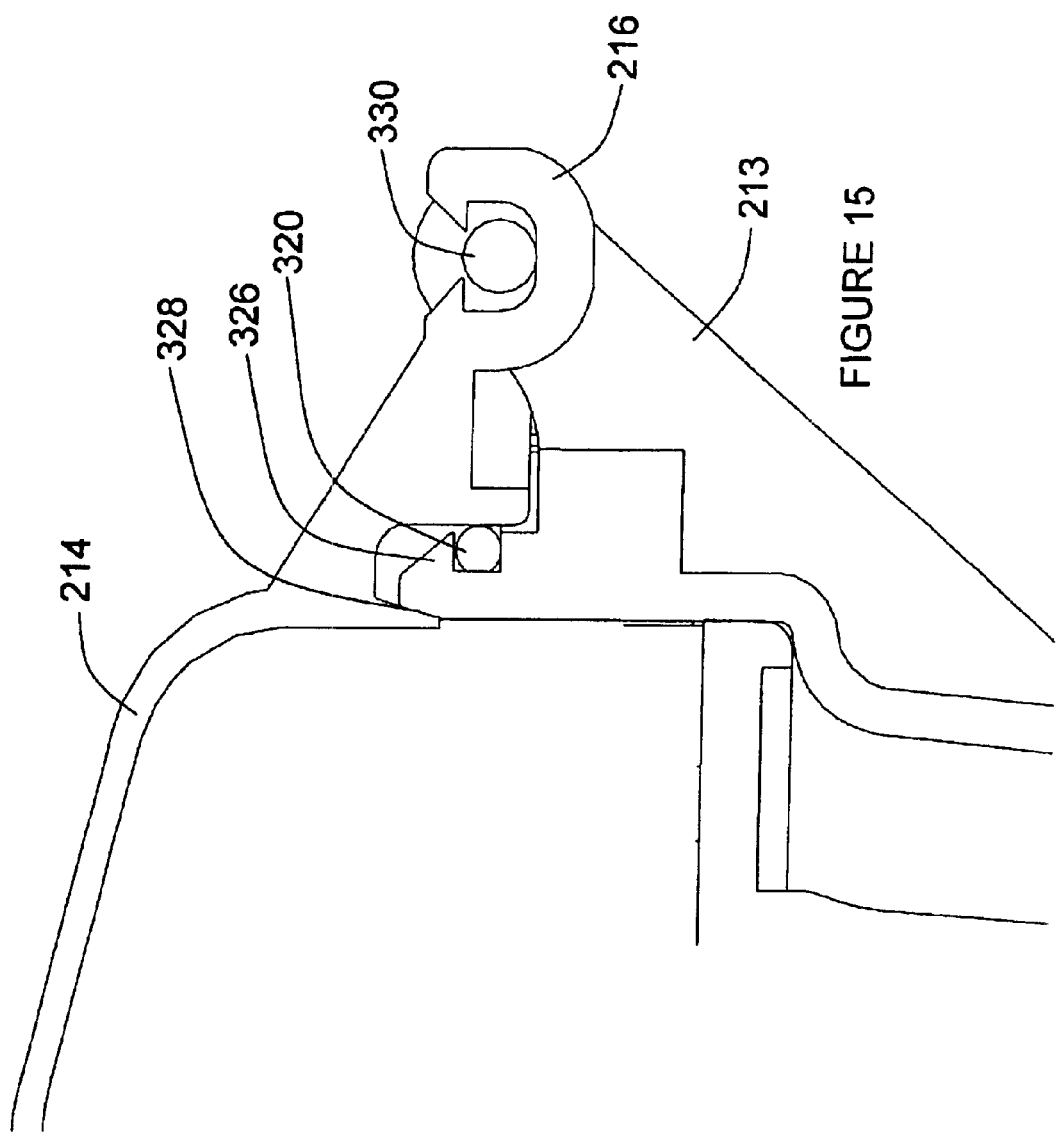
FIG. 15 is a section through a hinge of the box of FIG. 5.

Hinges 216 should be configured so that they do not interfere with the fitting of top 214 onto base 213. Hinges 216 preferably permit top 214 to float slightly, so that it can find its own position in respect of base 213. FIG. 15 is a sectional view through a portion of the interface between top 214 and base 213 which shows ramped surface 328 providing support to the top edge of base 213 when box 200 is closed. FIG. 15 also shows a cross-section through a hinge 216 which has a pin 330 which is free to float somewhat relative to top 214.

The main portions of box 200 including top 214 and base 213 may be made from a suitable rigid material. The material is preferably flame-retardant. By way of example, these components may be injection-molded from a suitable plastic such as PVC, polycarbonate or the like.

There are various advantages to junction boxes 40 and 200 which are described above. One advantage is that they are quite compact, although the volume of either of these junction boxes may be made as large as required, within practical limits. Another advantage is that all cables come out of the same side of the box. This is beneficial because it facilitates pulling box 40 or 200 out of a vault or other underground enclosure through what can sometimes be a relatively small opening. It can be appreciated that the design of box 200, in particular, permits organized wiring and also permits new cables C2 to be readily added.

A suitable connector may be provided on the end of cable C1 for joining cable C1 to another cable or a piece of equipment.

As will be apparent to those skilled in the art in the light of the foregoing disclosure, many alterations and modifications are possible in the practice of this invention without departing from the spirit or scope thereof. For example:

The number of conductors in cable C1 and C2 may vary.

Box 200 could be round, as illustrated, or some other shape, such as rectangular, square, octagonal, etc. To enable sealing of box 200 in the manner described above with an o-ring 320, it is preferable that box 200 be either round or, at least, have rounded corners.

Figure 16:
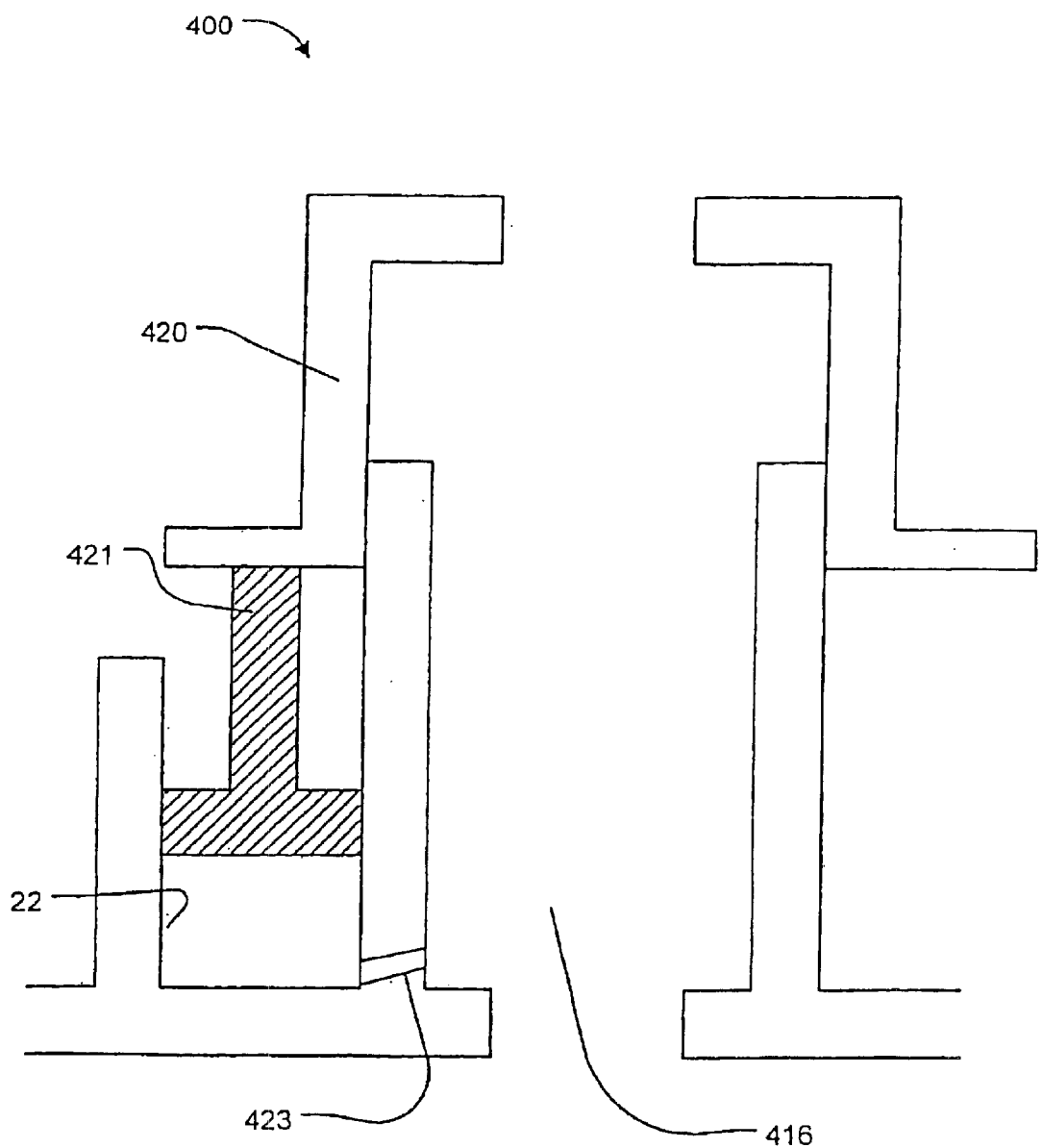
FIG. 16 is a section through a through-fitting according to an alternative embodiment of the invention.

Through-fittings 40 may comprise another mechanism for automatically injecting grease from a chamber as they are tightened onto a cable or the like. For example, FIG. 16 shows a through-fitting 400 which has a cap 420 which bears against a piston 421. Piston 421 is located in a cylinder 422 which is filled with an extrudable sealant such as grease. Screwing down cap 420 displaces piston 421 and thereby causes grease to be extruded from cylinder 422 into bore 416 through a passage 423. A through-fitting of the type shown in FIG. 16 will typically include seals, cable strain reliefs and the like which are not shown in FIG. 16.

The foregoing description mentions through-fittings and junction boxes which include various components and sub-assemblies. These various components and sub-assemblies do not all need to be used together. They may be used individually, or in combination with each other, or in combination with other elements not disclosed herein.

The invention is not limited to junction boxes for telephone lines.

The through-fittings described above, particularly through-fitting 10 may provide good enough sealing that, for some applications, grease is not necessary.

Accordingly, the scope of the invention is to be construed in accordance with the substance defined by the following claims.

What is claimed is:

1. A through-fitting comprising:
   a stub having a bore extending therethrough;
   a cap on the stub at an outer end of the bore, the cap movable in an inward direction relative to the stub;
   a chamber containing an extrudable material, the chamber having a volume which is diminished by movement of the stub in the inward direction; and
   a passage communicating between the chamber and the bore.

2. A through-fitting according to claim 1 wherein the chamber comprises an annular chamber defined between the cap and the outer end of the stub.

3. A through-fitting according to claim 2 wherein the passage comprises at least one axially-extending groove inside the bore.

4. A through-fitting according to claim 3 comprising a sleeve disposed within the bore and having an inwardly angled end surface, the sleeve movable axially within the bore in response to motion of the cap.

5. A through-fitting according to claim 4 wherein the passage comprises an aperture in the sleeve.

6. A through-fitting according to claim 5 comprising a burst member blocking the passage.

7. A through-fitting according to claim 6 wherein the burst member comprises a thin plastic member blocking the aperture in the sleeve.

8. A through-fitting according to claim 7 wherein the burst member and sleeve are integrally formed from plastic.

9. A through-fitting according to claim 1 comprising a burst member blocking the passage.

10. A through-fitting according to claim 1 comprising a piston slidably disposed within a cylinder wherein the chamber is defined between an end of the piston and the cylinder.

11. A through-fitting according to claim 1 comprising an elastromeric seal having a central aperture and located at an inner end of the bore.

12. A through-fitting according to claim 1 wherein the extrudable material comprises a silicone grease.

13. A junction box comprising a sealed enclosure and at least a first through-fitting according to claim 1 having the stub extending from a wall of the enclosure and the bore communicating between an interior of the inclosure and an exterior of the enclosure.

14. A through fitting according to claim 3 wherein the passage comprises an aperture in the stub.

15. A through fitting according to claim 14 comprising a burst member blocking the passage.

16. A through fitting according to claim 15 wherein the burst member comprises a thin plastic member blocking the aperture in the stub.

17. A through fitting according to claim 16 wherein the burst member and stub are integrally formed in plastic.

* * * * *

UNITED STATES PATENT AND TRADEMARK OFFICE
CERTIFICATE OF CORRECTION

| | | |
|---|---|---|
| PATENT NO. | : 6,894,225 B2 | |
| APPLICATION NO. | : 10/774444 | |
| DATED | : May 17, 2006 | |
| INVENTOR(S) | : Juergen Koessler | |

It is certified that error appears in the above-identified patent and that said Letters Patent is hereby corrected as shown below:

Col. 10 lines 10 & 11
in claim 1, the phrase "a volume which is diminished by movement of the stub in the inward direction" is replaced by --a volume which is diminished by movement of the cap in the inward direction--.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,894,225 B2  Page 1 of 1
APPLICATION NO. : 10/774444
DATED : May 17, 2005
INVENTOR(S) : Juergen Koessler It is certified that error appears in the above-identified patent and that said Letters Patent is hereby corrected as shown below:

Col. 10 lines 10 & 11
in claim 1, the phrase "a volume which is diminished by movement of the stub in the inward direction" is replaced by --a volume which is diminished by movement of the cap in the inward direction--.

This certificate supersedes Certificate of Correction issued September 19, 2006.

Signed and Sealed this

Thirty-first Day of October, 2006

JON W. DUDAS
*Director of the United States Patent and Trademark Office*